(12) United States Patent
Ly et al.

(10) Patent No.: US 11,871,250 B2
(45) Date of Patent: Jan. 9, 2024

(54) MACHINE LEARNING COMPONENT MANAGEMENT IN FEDERATED LEARNING

(71) Applicant: QUALCOMM Incorporated, San Diego, CA (US)

(72) Inventors: Hung Dinh Ly, San Diego, CA (US); Taesang Yoo, San Diego, CA (US); June Namgoong, San Diego, CA (US); Hwan Joon Kwon, San Diego, CA (US); Krishna Kiran Mukkavilli, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 17/447,260

(22) Filed: Sep. 9, 2021

(65) Prior Publication Data

US 2022/0104033 A1 Mar. 31, 2022

Related U.S. Application Data

(60) Provisional application No. 63/198,051, filed on Sep. 25, 2020.

(51) Int. Cl.
*H04L 41/16* (2022.01)
*H04W 24/02* (2009.01)
*G06N 20/20* (2019.01)
*H04L 41/082* (2022.01)
*H04W 28/02* (2009.01)
*H04W 80/06* (2009.01)
*H04L 67/01* (2022.01)

(52) U.S. Cl.
CPC ............ *H04W 24/02* (2013.01); *G06N 20/20* (2019.01); *H04L 41/082* (2013.01); *H04L 67/01* (2022.05); *H04W 28/0215* (2013.01); *H04W 80/06* (2013.01)

(58) Field of Classification Search
None
See application file for complete search history.

(56) References Cited

U.S. PATENT DOCUMENTS

| | | | |
|---|---|---|---|
| 10,904,258 B2 * | 1/2021 | Kwatra | H04L 67/306 |
| 11,237,890 B2 * | 2/2022 | Verburg | G06F 11/3452 |
| 11,537,909 B2 * | 12/2022 | Arthanat | G06F 11/3419 |
| 2017/0208455 A1 * | 7/2017 | Au | H04W 8/22 |
| 2018/0367382 A1 * | 12/2018 | Zhang | H04L 41/0806 |
| 2019/0311227 A1 * | 10/2019 | Kriegman | G06V 30/19173 |

(Continued)

FOREIGN PATENT DOCUMENTS

WO WO-2021063500 A1 * 4/2021 ............. G06N 20/00

*Primary Examiner* — Ajit Patel
(74) *Attorney, Agent, or Firm* — QUALCOMM Incorporated

(57) ABSTRACT

Various aspects of the present disclosure generally relate to wireless communication. In some aspects, a client device may receive, using at least one lower layer of a wireless communication protocol stack, a machine learning component from a server device. The client device may transmit, to the server device and using the at least one lower layer, an update associated with the machine learning component, wherein transmitting the update comprises transmitting a plurality of transport blocks. Numerous other aspects are described.

30 Claims, 11 Drawing Sheets

(56) References Cited

U.S. PATENT DOCUMENTS

| | | | |
|---|---|---|---|
| 2020/0367051 A1* | 11/2020 | Wang | H04W 8/245 |
| 2021/0126737 A1* | 4/2021 | Zhang | H04L 5/0094 |
| 2021/0152439 A1* | 5/2021 | Soulhi | H04L 43/04 |
| 2021/0160149 A1* | 5/2021 | Ma | H04L 41/0803 |
| 2022/0083904 A1* | 3/2022 | Pastore | G06N 3/04 |

* cited by examiner

MACHINE LEARNING COMPONENT MANAGEMENT IN FEDERATED LEARNING

CROSS-REFERENCE TO RELATED APPLICATION

This Patent Application claims priority to U.S. Provisional Patent Application No. 63/198,051, filed on Sep. 25, 2020, entitled "MACHINE LEARNING COMPONENT MANAGEMENT IN FEDERATED LEARNING," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for machine learning component management in federated learning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a client device includes receiving, using at least one lower layer of a wireless communication protocol stack, a machine learning component from a server device; and transmitting, to the server device and using the at least one lower layer, an update associated with the machine learning component, wherein transmitting the update comprises transmitting a plurality of transport blocks.

In some aspects, a method of wireless communication performed by a server device includes transmitting, using at least one lower layer of a wireless communication protocol stack, a machine learning component to a client device; and receiving, from the client device and using the at least one lower layer, an update associated with the machine learning component, wherein receiving the update comprises receiving a plurality of transport blocks.

In some aspects, a client device for wireless communication includes a memory; and one or more processors coupled to the memory, the one or more processors configured to: receive, using at least one lower layer of a wireless communication protocol stack, a machine learning component from a server device; and transmit, to the server device and using the at least one lower layer, an update associated with the machine learning component, wherein transmitting the update comprises transmitting a plurality of transport blocks.

In some aspects, a server device for wireless communication includes a memory; and one or more processors coupled to the memory, the one or more processors configured to: transmit, using at least one lower layer of a wireless communication protocol stack, a machine learning component to a client device; and receive, from the client device and using the at least one lower layer, an update associated with the machine learning component, wherein receiving the update comprises receiving a plurality of transport blocks.

In some aspects, a non-transitory computer-readable medium storing a set of instructions for wireless communication includes one or more instructions that, when executed by one or more processors of a client device, cause the client device to: receive, using at least one lower layer of a wireless communication protocol stack, a machine learning component from a server device; and transmit, to the server device and using the at least one lower layer, an update associated with the machine learning component, wherein transmitting the update comprises transmitting a plurality of transport blocks.

In some aspects, a non-transitory computer-readable medium storing a set of instructions for wireless communication includes one or more instructions that, when executed by one or more processors of a server device, cause the server device to: transmit, using at least one lower layer of a wireless communication protocol stack, a machine learning component to a client device; and receive, from the client device and using the at least one lower layer, an update associated with the machine learning component, wherein receiving the update comprises receiving a plurality of transport blocks.

In some aspects, an apparatus for wireless communication includes means for receiving, using at least one lower layer of a wireless communication protocol stack, a machine learning component from a server device; and means for transmitting, to the server device and using the at least one lower layer, an update associated with the machine learning component, wherein transmitting the update comprises transmitting a plurality of transport blocks.

In some aspects, an apparatus for wireless communication includes means for transmitting, using at least one lower layer of a wireless communication protocol stack, a machine learning component to a client device; and means for receiving, from the client device and using the at least one lower layer, an update associated with the machine learning component, wherein receiving the update comprises receiving a plurality of transport blocks.

Aspects generally include a method, apparatus, system, computer program product, non-transitory computer-readable medium, user equipment, base station, wireless communication device, client device, server device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
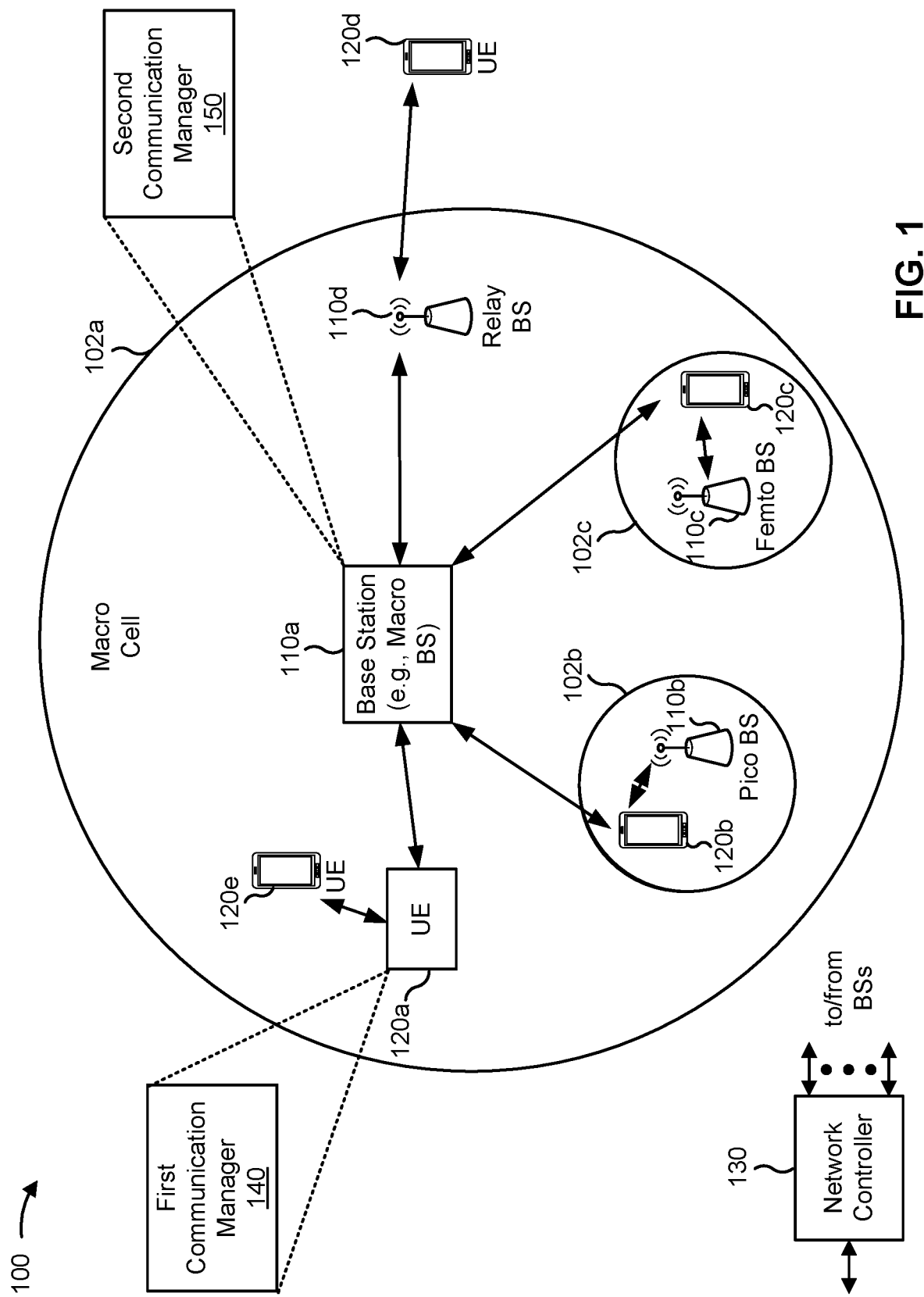
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Various aspects may include one or more client devices that may communicate with one or more server devices. Client devices may include software and/or hardware configured to perform one or more operations and to communicate with one or more server devices. Server devices may include software and/or hardware configured to perform one or more operations and to communicate with one or more client devices. Client devices and/or server devices may be, include, be included in, and/or be implemented on any number of different types of computing devices such as, for example, network devices (e.g., wireless network devices and/or wired network devices), portable computers, laptops, tablets, workstations, personal computers, controllers, in-vehicle control networks, Internet-of-Things (IoT) devices, traffic control devices, integrated access and backhaul (IAB) nodes, user equipment (UEs), base stations, relay stations, switches, routers, customer premises equipment (CPEs), and/or vehicles (e.g., land-based vehicles, aerial vehicles, non-terrestrial vehicles, and/or water-based vehicles).

As indicated above, in some aspects, client devices and/or server devices may be, include, be included within, and/or be implemented on one or more wireless network devices. For example, in some aspects, a client device may be, include, be included in, and/or be implemented on a UE and a server device may be, include, be included in, and/or be implemented on a base station. In some aspects, a client device may include a server device that is configured to operate as a client. In some aspects, a server device may include a client device configured to operate as a server. In some aspects, one or more server devices and/or one or more client devices may communicate using any number of types of communication connections such as, for example, wired networks, wireless networks, multi-hop networks, and/or combinations of wired networks, wireless networks, and/or multi-hop networks.

Figure 2:
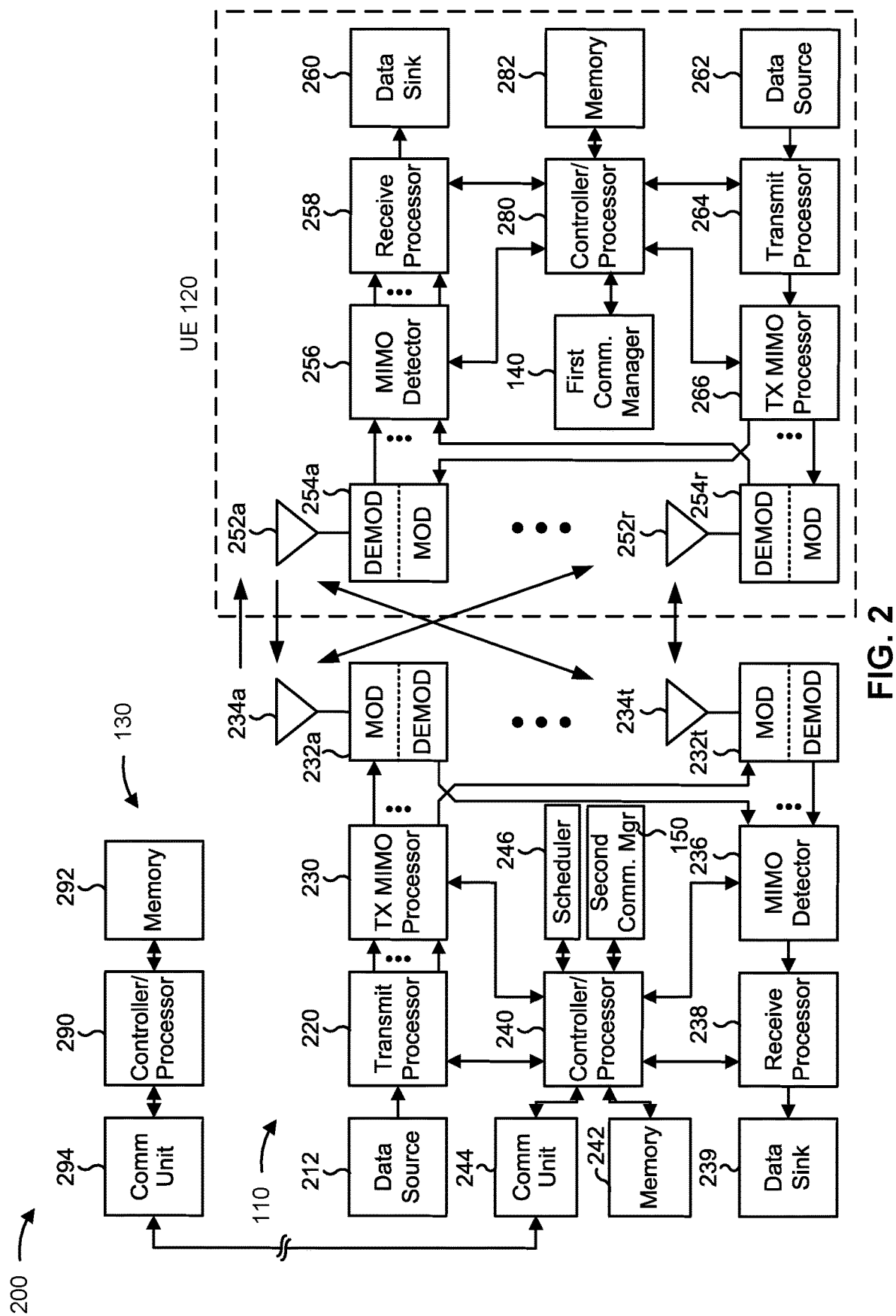
FIG. 2 is a diagram illustrating an example of a base station in communication with a user equipment (UE) in a wireless network, in accordance with the present disclosure.
Figure 3:
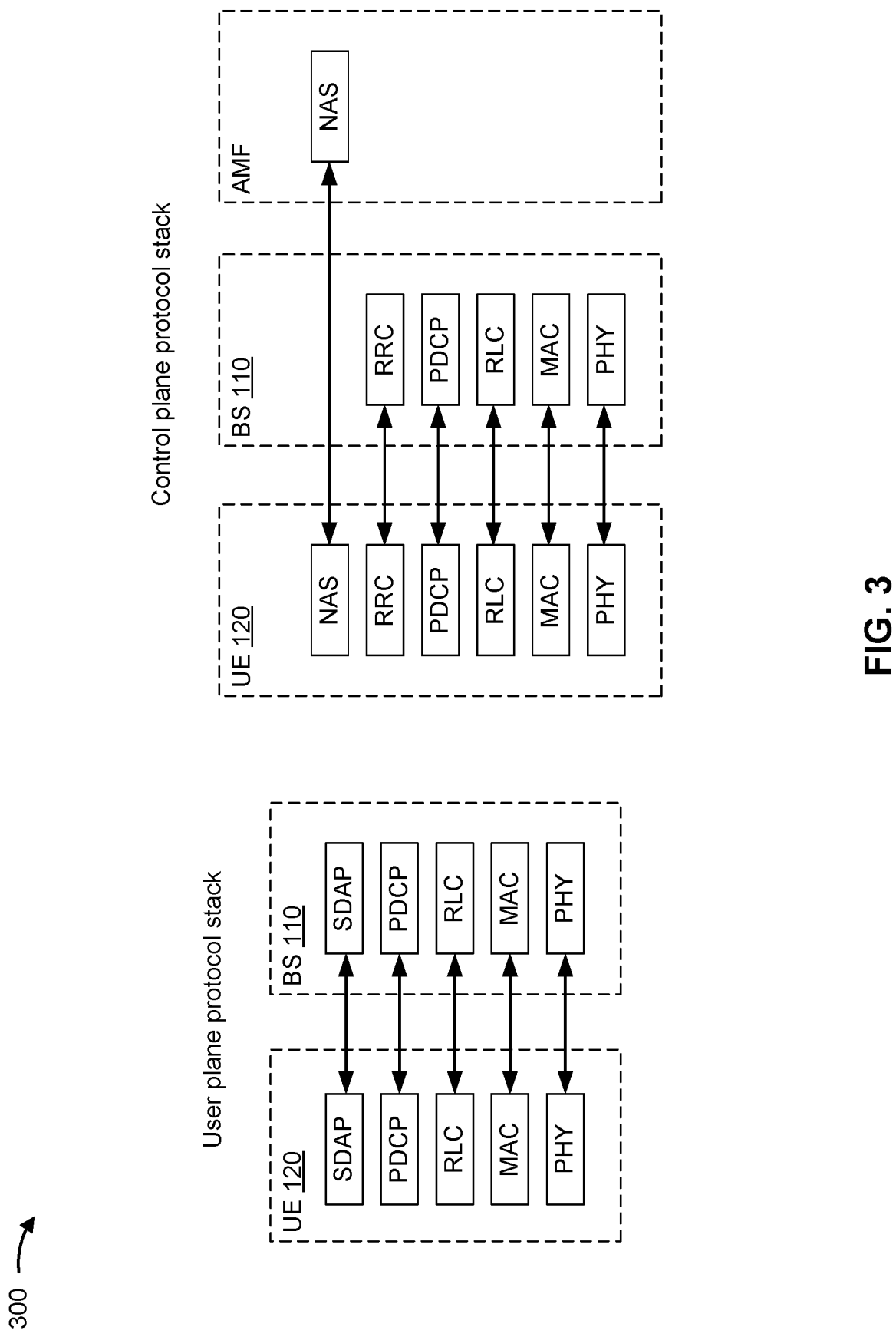
FIG. 3 is a diagram illustrating an example of a user plane protocol stack and a control plane protocol stack for a base station and a core network in communication with a UE, in accordance with the present disclosure.

FIGS. 1 and 2, and the accompanying text below, provide examples of aspects of wireless networks and wireless network devices that may be used to implement one or more aspects of subject matter disclosed herein. FIG. 3 provides information regarding wireless communication protocol stacks. FIGS. 4-7, and the accompanying text, describe aspects of operations that may be performed by client devices and/or server devices, which may include, for example, UEs and base stations as shown in, and described in connection with, FIGS. 1 and 2, and/or other implementations of client devices and/or server devices such as, for example, those described above. FIGS. 8-11, and the accompanying text, describe examples of apparatuses for implementing client devices and/or server devices, in accordance with various aspects of the present disclosure. The apparatuses may include wireless network devices and/or any number of other computing devices, as indicated above in connection with client devices and/or server devices.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. As indicated above, one or more aspects of the wireless network 100 may be used to implement aspects of one or more clients and servers as shown in FIG. 3 and described below in connection therewith. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used. In some aspects, a base station 110 may be, include, be included in, and/or be used to implement a server such as the server device 408 shown in FIG. 4 and described below. A UE may be, include, be included in, and/or be used to implement a client such as the client 402 shown in FIG. 4 and described below. In some aspects, a base station 110 may be, include, be included in, and/or be used to implement a client. In some aspects, a UE 120 may be, include, be included in, and/or be used to implement a server.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an IAB network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations, IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a CPE. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may receive, using at least one lower layer of a wireless communication protocol stack, a machine learning component from a server device; and transmit, to the server device and using the at least one lower layer, an update associated with the machine learning component, wherein transmitting the update comprises transmitting a plurality of transport blocks. Additionally, or alternatively, the first communication manager 140 may perform one or more other operations described herein.

In some aspects, the base station 110 may include a second communication manager 150. As described in more detail elsewhere herein, the second communication manager 150 may transmit, using at least one lower layer of a wireless communication protocol stack, a machine learning component to a client device; and receive, from the client device and using the at least one lower layer, an update associated with the machine learning component, wherein receiving the update comprises receiving a plurality of transport blocks. Additionally, or alternatively, the second communication manager 150 may perform one or more other operations described herein.

As indicated above, FIG. 1 is provided merely as an example. Other examples may differ from what is described with regard to FIG. 1.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with machine learning component management in federated learning, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a client device (e.g., the UE 120) may include means for receiving, using at least one lower layer of a wireless communication protocol stack, a machine learning component from a server device, means for transmitting, to the server device and using the at least one lower layer, an update associated with the machine learning component, wherein transmitting the update comprises transmitting a plurality of transport blocks, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a server device (e.g., the base station 110) may include means for transmitting, using at least one lower layer of a wireless communication protocol stack, a machine learning component to a client device, means for receiving, from the client device and using the at least one lower layer, an update associated with the machine learning component, wherein receiving the update comprises receiving a plurality of transport blocks, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the BS 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the BS 110. On the control plane, the UE 120 and the BS 110 may include respective radio resource control (RRC) layers. Furthermore, the UE 120 may include a non-access stratum (NAS) layer in communication with an NAS layer of an access and management mobility function (AMF). The AMF may be associated with a core network associated with the BS 110, such as a 5G core network (5GC) or a next-generation radio access network (NG-RAN). A control plane function may handle transport of control information between the UE and the core network. Generally, a first layer is referred to as "above" a second layer if the first layer is further from the PHY layer than the second layer. Throughout this document, the PHY layer and the MAC layer may be referred to as "lower" layers, while any layers above the PHY layer and the MAC layer may be referred to as "upper" layers. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the BS 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted, and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the BS 110 is receiving an uplink communication), the operations may be similar to those described for the transmitting side, but reversed. For example, the PHY layer may receive TBs, and may provide the TBs on one or more transport channels to the MAC layer. The MAC layer may map the transport channels to logical channels, and may provide data to the RLC layer via the logical channels. The RLC layer may map the logical channels to RLC channels, and may provide data to the PDCP layer via the RLC channels. The PDCP layer may map the RLC channels to radio bearers, and may provide data to the SDAP layer or the RRC/NAS layer via the radio bearers.

Data may be passed between the layers in the form of PDUs and SDUs. An SDU is a unit of data that has been passed from a layer or sublayer to a layer below the prior layer. For example, the PDCP layer may receive a PDCP SDU. A given layer may then encapsulate the unit of data into a PDU, and may pass the PDU to a layer below that layer. For example, the PDCP layer may encapsulate the PDCP SDU into a PDCP PDU, and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 3 is provided as an example. Other examples may differ from what is described with regard to FIG. 3.

A client device operating in a network may report information to a server device. The information may include information associated with received signals and/or positioning information, among other examples. For example, a client device may perform measurements associated with reference signals and report the measurements to a server device. In some examples, the client device may measure reference signals during a beam management process for channel state feedback (CSF), may measure received power of reference signals from a serving cell and/or neighbor cells, may measure signal strength of inter-radio access technology (e.g., WiFi) networks, and/or may measure sensor signals for detecting locations of one or more objects within an environment. However, reporting information to the server device may consume communication and/or network resources.

To mitigate consumption of resources, a client device (e.g., a UE, a base station, a TRP, a network device, an LEO satellite, an MEO satellite, a GEO satellite, and/or an HEO satellite) may use one or more machine learning components (e.g., neural networks) that may be trained to learn dependence of measured qualities on individual parameters, isolate the measured qualities through various layers of the one or more machine learning components (also referred to as "operations"), and compress measurements in a way that limits compression loss. The client device may transmit the compressed measurements to the server device (e.g., a TRP, another UE, and/or a base station). The server device may decode the compressed measurements using one or more decompression operations and reconstruction operations associated with one or more machine learning components. The one or more decompression and reconstruction operations may be based at least in part on a set of features of the compressed data set to produce reconstructed measurements. The server device may perform a wireless communication action based at least in part on the reconstructed measurements.

A machine learning component is a component (e.g., hardware, software, or a combination thereof) of a client device that performs one or more machine learning procedures. A machine learning component may include, for example, hardware and/or software that may learn to perform a procedure without being explicitly trained to perform the procedure. A machine learning component may include, for example, a feature learning processing block and/or a representation learning processing block. A machine learning component may include one or more neural networks. A neural network may include, for example, an autoencoder.

In some aspects, a machine learning component may be configured to determine a latent vector based at least in part on an observed wireless communication vector. In some aspects, the observed wireless communication vector and the latent vector may be associated with a wireless communication task. The observed wireless communication vector may include an array of observed values associated with one or more measurements obtained in connection with a wireless communication. In some aspects, for example, the wireless communication task may include determining CSF, determining positioning information associated with the client device, determining a modulation associated with a wireless communication, and/or determining a waveform associated with a wireless communication. The latent vector h is the output of a machine learning component that takes the observed wireless communication vector as input. The latent vector may include an array of hidden values associated with one or more aspects of the observed communication vector.

In some cases, machine learning components may be trained using federated learning. Federated learning is a machine learning technique that enables multiple clients to collaboratively train machine learning models based on training data, while the server device does not collect the training data from the client devices. Federated learning techniques may involve one or more global neural network models trained from data stored on multiple client devices. For example, in a federated averaging algorithm, the server device sends the neural network model to the client devices. Each client device trains the received neural network model using its own data and sends back an updated neural network model to the server device. The server device averages the updated neural network models from the client devices to obtain a new neural network model.

However, in some cases, some client devices may be operating in different scenarios than other client devices (e.g. indoor/outdoor, stationary in a coffee shop/mobile on a highway, and/or the like). In some cases, different client devices may be subject to different implementation aspects (e.g. different form factors, different radio frequency (RF) impairments, and/or the like). As a result, in some examples, finding a machine learning component model that works well on all the devices in a federated learning network in terms of physical layer link performance may be difficult.

To provide and train personalized machine learning components adapted for respective client devices, a machine learning component may be customized based on an environment of a client device. In some cases, an observed environmental vector may be used to characterize an environment of a client device. An observed environmental vector may include an array of observed values associated with one or more features of an environment of a client device. An environment of a client device may include any characteristic associated with the client device that may affect an operation of the client device, a signal received by the client device, and/or a signal transmitted by the client device. An operation of the client device may include any operation that may be performed on, or in connection with, any type of information. An operation of the client device may include, for example, receiving a signal, decoding a signal, demodulating a signal, processing a signal, encoding a signal, modulating a signal, and/or transmitting a signal. In some aspects, the one or more features of the environment of the client device may include characteristics of the client device, large scale channel characteristics, channel information, signal information, and/or image data, among other examples.

In some cases, for example, a number of machine learning components may be used by a client. One or more machine learning components may be configured to extract features about an environment of the client to determine a customization feature vector, a conditioning vector, and/or the like. The customization feature vector may be used to condition one or more additional machine learning components to work in the perceived environment. The customization feature vector and an observed wireless communication vector may be provided as input to the one or more additional machine learning components, which may be configured to perform a wireless communication task such as, for example, providing a latent vector. A conditioning vector may include client-specific parameters that can be loaded into one or more other machine learning components to condition one or more additional machine learning components to work in the perceived environment.

In some cases, a client device may provide the observed environmental vector, the customization feature vector, the conditioning vector, and/or the like to the server device. The client device also may provide the latent vector to the server device, which may use one or more machine learning components corresponding to one or more machine learning components of the client device to recover the observed wireless communication vector.

In some cases, a client device may receive a machine learning component from a server device. The machine learning component may include, for example, a neural network model, parameters corresponding to a neural network model, a set of machine learning models, and/or the like. The machine learning component may be, for example, a first machine learning component that is provided to the client device, and/or a globally updated (e.g., updated at the server device) machine learning component. The client device may train the machine learning component based at least in part on training data that the client device collects to obtain a locally updated machine learning component. For example, the client device may obtain the training data based on observations of an environment of the client device and/or processing received signals.

The client device may report an update to the server device. The update may include the locally updated machine learning component, data indicating the locally updated machine learning component, a set of gradients associated with a loss function corresponding to the locally updated machine learning component, a set of parameters (e.g., neural network weights) corresponding to the locally updated machine learning component, and/or the like. In implementations involving wireless communication between the server device and the client device, the update may be too large to be transmitted in one transport block by a lower layer of a protocol stack associated with a client device. Similarly, the initial machine learning component may be too large to be transmitted in one transport block by a lower layer of a protocol stack associated with a server device. Thus, transmitting a machine learning component and/or an update of a machine learning component using one transport block may result in unreliable federated learning procedures, which may result in machine learning components that do not operate accurately, thereby negatively impacting network performance.

Aspects of the techniques and apparatuses described herein may facilitate machine learning component management in federated learning. In some aspects, a client device may receive an initial machine learning component from a server device and may locally train the initial machine learning component to determine an update. The client device may transmit the update, using at least one lower layer of a wireless communication protocol stack, by transmitting a plurality of transport blocks. In some aspects, the client device may manage the transmission using one or more upper layers of the wireless communication protocol stack. The server device may receive the update using at least one lower layer of the wireless communication protocol stack and may manage the transmission and/or reception of the initial machine learning component and/or the update using one or more upper layers of the wireless communication protocol stack. As a result, aspects may lead to more reliable use of network resources in federated learning, thereby positively impacting network performance. Aspects of the techniques described herein may be used for any number of cross-node machine learning challenges including, for example, facilitating channel state feedback, facilitating positioning of a client device, and/or learning of modulation and/or waveforms for wireless communication.

Figure 4:
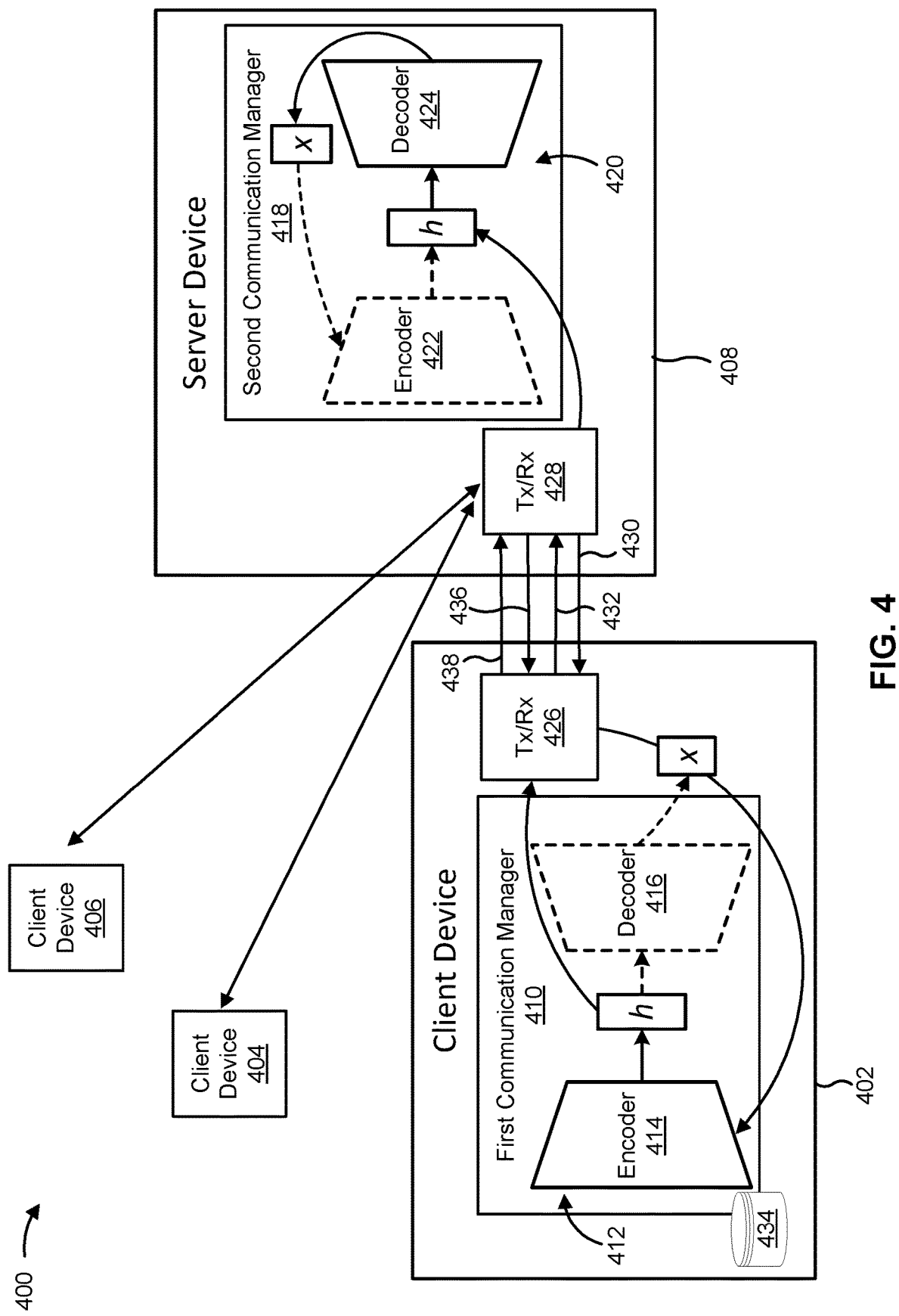
FIGS. 4 and 5 are diagrams illustrating examples associated with machine learning component management in federated learning, in accordance with the present disclosure.

FIG. 4 is a diagram illustrating an example 400 of machine learning component update reporting in federated learning, in accordance with the present disclosure. As shown, a number of client devices 402, 404, and 406 may communicate with a server device 408. The client devices 402, 404, and 406 and the server device 408 may communicate with one another via a wireless network (e.g., the wireless network 100 shown in FIG. 1). In some cases, more than three client devices 402, 404, and 406 and/or more than one server device 408 may communicate with one another.

The client devices 402, 404, and/or 406 and/or the server device 408 may be, be similar to, include, be included in, and/or be implemented using a computing device. The computing device may include, for example, a wireless communication device, a network device (e.g., a wireless network device and/or wired network device), a portable computer, a laptop, a tablet, a workstation, a personal computer, a controller, an in-vehicle control network, an IoT device, a traffic control device, an IAB node, a UE, a base station, a relay station, a switch, a router, a CPE, a vehicle (e.g., land-based vehicle, aerial vehicle, non-terrestrial vehicle, and/or water-based vehicle), and/or any combination. For example, the client device 402 may be a UE (e.g., UE 120 shown in FIG. 1) and the server device 408 may be a base station (e.g., base station 110 shown in FIG. 1), and the client device 402 and the server device 408 may communicate via an access link. The client device 402 and the server device 408 may be UEs 120 that communicate via a sidelink.

FIG. 4 illustrates the client device 402. The client devices 404 and/or 406 may be similar to the client device 402 and/or may have the same or similar aspects as the client device 402. As shown, the client device 402 may include a first communication manager 410 (e.g., the first communication manager 140 shown in FIG. 1) that may be configured to utilize a machine learning component (shown, for example, as a client autoencoder 412) to perform one or more wireless communication tasks. The first communication manager 410 may be configured to utilize any number of additional machine learning components not shown in FIG. 4.

As shown, the client machine learning component 412 may include an encoder 414 configured to receive an observed wireless communication vector, x, and to provide a latent vector, h, as output. The client machine learning component 412 also may include a decoder 416 configured to receive the latent vector h and to provide the observed wireless communication vector x as output.

As shown in FIG. 4, the server device 408 may include a second communication manager 418 (e.g., the second communication manager 150) that may be configured to utilize a server machine learning component (shown, for example, as a server autoencoder 420) to perform one or more wireless communication tasks. For example, in some aspects, the server machine learning component 420 may correspond to the client machine learning component 412. The second communication manager 418 may be configured to utilize any number of additional machine learning components not shown in FIG. 4. The server machine learning component 420 may include an encoder 422 configured to receive the observed wireless communication vector x as input and to provide a latent vector h as output. The server machine learning component 420 also may include a decoder 424 configured to receive the latent vector h as input and to provide the observed wireless communication vector x as output.

As shown in FIG. 4, the client device 402 may include a transceiver (shown as Tx/Rx 426) that may facilitate wireless communications with a transceiver 428 of the server 408. As shown by reference number 430, the server device 408 may transmit, using the transceiver 428, a wireless communication to the client device 402. The wireless communication may include, for example, a reference signal such as a channel state information reference signal (CSI-RS). The transceiver 426 of the client device 402 may receive the wireless communication. The first communication manager 410 may determine an observed wireless communication vector x based at least in part on the wireless communication. For example, in aspects in which the wireless communication is a CSI-RS, the observed wireless communication vector x may include channel state information (CSI).

As shown, the first communication manager 410 may provide, as input, the observed wireless communication vector x, to the encoder 414 of the client machine learning component 412. In some aspects, the communication manager 410 also may provide, as input to the encoder 414, a feature vector associated with an environment of the client device 402. In some aspects, the communication manager 410 may also load client-specific parameters into one or more levels of the encoder 414. The encoder 414 of the client machine learning component 412 may determine, based at least in part on the observed wireless communication vector x, a latent vector h. As shown, the communication manager 410 may provide the latent vector h to the transceiver 426 for transmission. As shown by reference number 432, the transceiver 426 may transmit, and the transceiver 428 of the server 408 may receive, the latent vector h. As shown, the communication manager 418 of the server 408 may provide the latent vector h as input to the decoder 424 of the server machine learning component 420. The decoder 424 may determine (e.g., reconstruct) the observed wireless communication vector x based at least in part on the latent vector h. In some aspects, the server 408 may perform a wireless communication action based at least in part on the observed wireless communication vector x. For example, in aspects in which the observed wireless communication vector x comprises CSI, the communication manager 418 of the server 408 may use the CSI for communication grouping, beamforming, and/or the like.

The client devices 402, 404, and 406 may locally train machine learning components using training data collected by the client device 402, 404, and 406, respectively. A client device 402, 404, or 406 may train a machine learning component such as a neural network by optimizing a set of model parameters, $w^{(n)}$, associated with the machine learning component, where n is the federated learning round index. The set of client devices 402, 404, and 406 may be configured to provide updates to the server device 408 multiple times (e.g., periodically, on demand, upon updating a local machine learning component, etc.). Each time the server device 408 receives updates from a client device 402, 404, 406, it is referred to as a round. The federated learning round index indicates the number of the round since the last global update was transmitted, by the server device 408, to the client device 402, 404, 406.

In some aspects, for example, the first communication manager 410 of the client device 402 may determine an update corresponding to the machine learning component 412 by training the machine learning component 412. In some aspects, the client device 402 may collect training data and store it in a memory device 434. The stored training data may be referred to as a "local dataset." In some aspects, the first communication manager 410 may access training data from the memory device 434 and use the training data to generate training output from the machine learning component 412.

For example, as indicated by the dashed lines associated with the client autoencoder 412, the decoder 416 may be used, along with training data, to reconstruct a wireless communication training vector. The reconstructed training vector may be used to facilitate determining the model parameters $w^{(n)}$ that maximize a variational lower bound function. A negative variational lower bound function, which is the negative of the variational lower bound function, may correspond to a global loss function, F(w), associated with the machine learning component. A stochastic gradient descent (SGD) algorithm may be used to optimize the model parameters $w^{(n)}$. The client device 402 may perform one or more SGD procedures to determine the optimized parameters $w^{(n)}$ and may determine gradients, $g_k^{(n)}$, of the loss function F(w), where k is an index identifying the client device. The first communication manager 410 may further refine the machine learning component 412 based at least in part on the loss function value, the gradients, and/or the like.

By training the machine learning component, the first communication manager 410 may determine an update corresponding to the machine learning component 412. In some aspects, the update may include an updated set of model parameters $w^{(n)}$, a difference between the updated set of model parameters $w^{(n)}$ and a prior set of model parameters $w^{(n-1)}$, a set of gradients $g_k^{(n)}$, an updated machine learning component (e.g., an updated neural network model), and/or the like. The client device 402 may transmit the update, or a compressed version thereof, to the server device 408, as described below.

As shown by reference number 436, the server device 408 may transmit, and the client device 402 may receive, a machine learning component. For example, the server device 408 may transmit data that describes the machine learning component 412, parameters (e.g., neural network weights) associated with the machine learning component 412, and/or the like. The machine learning component 412 may be a new machine learning component (e.g., the first time the machine learning component has been provided to the client device 402) and/or a globally updated machine learning component 412.

A globally updated machine learning component is a machine learning component that has been updated by the server device 408. For example, in the context of federated learning, a globally updated machine learning component is a version of a machine learning component that has been updated, by the server device 408, based at least in part on local updates received from each of a plurality of client devices 402, 404, and/or 406. The server device 408 may determine the globally updated machine learning component by aggregating (e.g., averaging, summing, and/or the like) the updates received from the client devices 402, 404, and/or 406.

In some aspects, for example, at least one lower layer (e.g., a PHY or MAC layer) of a protocol stack associated with the server device 408 may receive the updates from the client devices 402, 404 and/or 406, and may provide the received updates to one or more upper layers (e.g., an RLC layer, a PDCP layer, an SDAP layer, an RRC layer, etc.) of the protocol stack. The one or more upper layers of the protocol stack may be configured to manage payload segmentation, security procedures, quality of service (QoS) procedures, and/or the like.

The one or more upper layers may provide the updates to the second communication manager 418, which may include an entity configured to perform federated learning orchestration. In some aspects, one or more aspects of the second communication manager 418 that are configured to perform federated learning orchestration may be maintained at the server device 408 and/or another device. For example, in some aspects, the one or more aspects of the second communication manager 418 that are configured to perform federated learning orchestration may include one or more entities maintained in a core network, a random access network, and/or the like. Federated learning orchestration may include configuring and/or otherwise managing reception of updates from the client devices 402, 404, and/or 406, determining a globally updated machine learning component (e.g., by aggregation of received updates), configuring and/or otherwise managing transmission of the globally updated machine learning components to the client devices 402, 404, and/or 406, and/or the like.

The server device 408 may transmit, and the client device 402 may receive, the machine learning component using at least one lower layer of a wireless communication protocol stack. The at least one lower layer may include, for example, at least one of a PHY layer or a MAC layer. In some aspects, for example, the machine learning component management may be handled by the at least one lower layer of the wireless communication protocol stack or by one or more upper layers of the wireless communication protocol stack. The machine learning component may reside in and/or be transmitted using the at least one lower layer. The machine learning component may be transmitted using a plurality of transport blocks.

As shown by reference number 438, the client device 402 may transmit an update associated with the machine learning component 412 to the server device 408. In some aspects, for example, the client device 402 transmits the update using at least one lower layer of a wireless communication protocol stack. The client device 402 may transmit the update using a plurality of transport blocks. In some aspects, the client device may prepare the transmission using one or more upper layers of the wireless communication protocol stack. In this way, aspects may facilitate more reliable transmission of the machine learning component and/or updates associated with the machine learning component.

In some aspects, a client device 402 and/or a server device 408 may perform one or more additional operations. A client device 402 and/or a server device 408 may be configured, for example, to use one or more different types of machine learning components, to use one or more procedures and/or components in addition to, or in lieu of, one or more machine learning components. For example, in some aspects, a client device 402 and/or a server device 408 may be configured to perform a first type of procedure in connection with a received signal and to perform a second type of procedure in connection with the received signal and/or another received signal. The first type of procedure may be performed using a first algorithm, a first processing block, and/or a first machine learning component, and the second type of procedure may be performed using a second algorithm, a second processing block, and/or a second machine learning component. In an example, a client device 402 may determine a first CSI associated with a received signal using a first procedure and may determine a second CSI associated with the received signal and/or a different received signal using a second procedure.

As indicated above, FIG. 4 is provided merely as an example. Other examples may differ from what is described with regard to FIG. 4.

Figure 5:
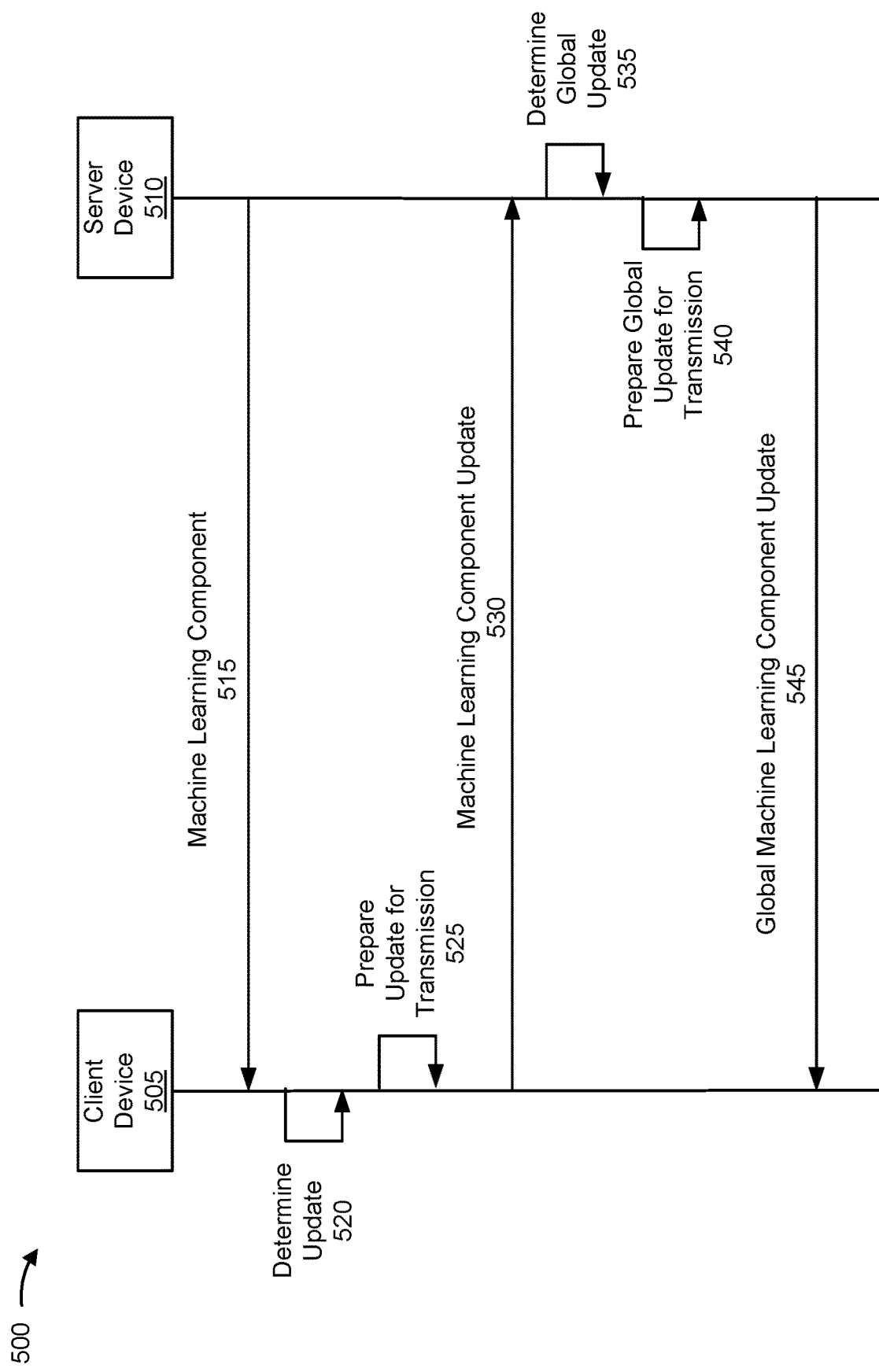

FIG. 5 is a diagram illustrating an example 400 of machine learning component management in federated learning, in accordance with the present disclosure. As shown, a client device 505 and a server device 510 may communicate with one another. In some aspects, the client device 505 may be, be similar to, include, or be included in the client device 402 shown in FIG. 4. In some aspects, the server device 510 may be, be similar to, include, or be included in the server device 408 shown in FIG. 4.

As shown by reference number 515, the server device 510 may transmit, and the client device 505 may receive, a machine learning component. The machine learning component may include, for example, at least one neural network model. The server device 510 may transmit the machine learning component by transmitting data that describes the machine learning component, transmitting parameters (e.g., neural network weights) associated with the machine learning component, and/or the like. The machine learning component may be a new machine learning component (e.g., the first time the machine learning component has been provided to the client device 505) and/or a globally updated machine learning component (e.g., a machine learning component that has been updated by the server device 510).

As shown by reference number 520, the client device 505 may determine an update associated with the machine learning component. For example, the client device 505 may collect training data and train the machine learning component, using the training data, to determine the update. As shown by reference number 525, in some aspects, the client device 505 may prepare the update for transmission. In some aspects, the client device 505 may prepare, using at least one lower layer of a wireless communication protocol stack, the update for transmission. For example, the at least one lower layer may include a PHY layer and/or a MAC layer.

In some aspects, the client device 505 may prepare the update for transmission using an upper layer of the wireless communication protocol stack. For example, the wireless communication protocol stack may include a user plane protocol stack and the upper layer may include at least one of an RLC layer, a PDCP layer, or an SDAP layer. In other examples, the wireless communication protocol stack may include a control plane protocol stack and the upper layer may include at least one of an RLC layer, a PDCP layer, an RRC layer, or an NAS layer.

For example, in some aspects, the client device 505 may segment the update into the plurality of transport blocks using one or more upper layers of the wireless communication protocol stack. The client device 505 may generate, based at least in part on the plurality of transport blocks and using the one or more upper layers of the wireless communication protocol stack, a plurality of data packets. The client device 505 may prepare the plurality of data packets for transmission based at least in part on a specified QoS.

As shown by reference number 530, the client device 505 may transmit, and the server device 510 may receive, the machine learning component update. In some aspects, the client device 505 may transmit the machine learning component update using the at least one lower layer. For example, the at least one lower layer may include a PHY layer and/or a MAC layer. In some aspects, the client device 505 may transmit the machine learning component update by transmitting the plurality of transport blocks (e.g., by transmitting the plurality of data packets).

The server device 510 may receive the plurality of transport blocks using a lower layer of the wireless communication protocol stack. In some aspects, the server device 510 may receive the plurality of data packets. The server device 510 may obtain the update from the plurality of data packets using one or more upper layers of the wireless communication protocol stack. The server device 510 may configure the update to a PHY layer of the wireless communication protocol stack.

As shown by reference number 535, the server device 510 may determine a global update associated with the machine learning component. For example, the server device 510 may receive, from at least one additional client device, at least one additional update corresponding to the machine learning component. The server device 510 (e.g., using a federated learning orchestration entity such as, for example, one or more aspects of the communication manager 418 shown in FIG. 4) may aggregate the update and the at least one additional update to generate a globally updated machine learning component. In some aspects, the server device 510 may aggregate the update and the at least one additional update by averaging the update and the at least one additional update.

As shown by reference number 540, the server device 510 may prepare the global update for transmission. For example, in some aspects, the server device 510 may segment the globally updated machine learning component into a plurality of transport blocks using one or more upper layers of the wireless communication protocol stack. The server device 510 may generate, based at least in part on the plurality of transport blocks and using the one or more upper layers of the wireless communication protocol stack, a plurality of data packets. The server device 510 may prepare the plurality of data packets for transmission based at least in part on a specified QoS.

As shown by reference number 545, the server device 510 may transmit, and the client device 505 may receive, a global machine learning component update. In some aspects, the server device 510 may transmit the update using one or more lower layers of the wireless communication protocol stack. In some aspects, the server device 510 may transmit the plurality of data packets.

In some aspects, the client device 505 may receive, using one or more lower layers of the wireless communication protocol stack, the plurality of data packets associated with the globally updated machine learning component. The client device may obtain the globally updated machine learning component from the plurality of data packets using one or more upper layers of the wireless communication protocol stack. The client device 505 may configure the globally updated machine learning component to a physical layer of the wireless communication protocol stack.

As indicated above, FIG. 5 is provided merely as an example. Other examples may differ from what is described with regard to FIG. 5.

Figure 6:
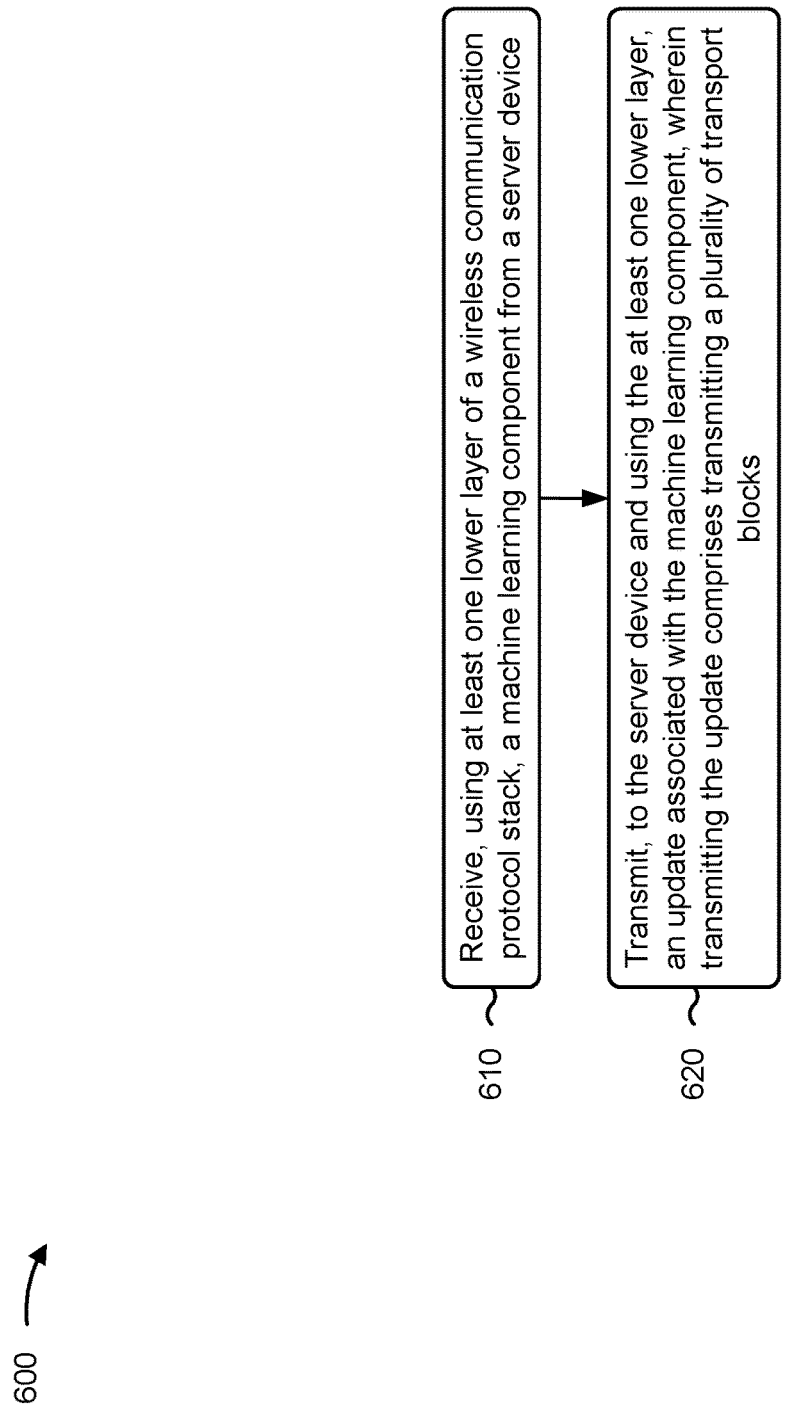
FIGS. 6 and 7 are diagrams illustrating example processes associated with machine learning component management in federated learning, in accordance with the present disclosure.

FIG. 6 is a diagram illustrating an example process 600 performed, for example, by a client device, in accordance with the present disclosure. Example process 600 is an example where the client device (e.g., client device 402 shown in FIG. 4, client device 505 shown in FIG. 5) performs operations associated with machine learning component management in federated learning.

As shown in FIG. 6, in some aspects, process 600 may include receiving, using at least one lower layer of a wireless communication protocol stack, a machine learning component from a server device (block 610). For example, the client device (e.g., using reception component 802, depicted in FIG. 8) may receive, using at least one lower layer of a wireless communication protocol stack, a machine learning component from a server device, as described above.

As further shown in FIG. 6, in some aspects, process 600 may include transmitting, to the server device and using the at least one lower layer, an update associated with the machine learning component, wherein transmitting the update comprises transmitting a plurality of transport blocks (block 620). For example, the client device (e.g., using transmission component 806, depicted in FIG. 8) may transmit, to the server device and using the at least one lower layer, an update associated with the machine learning component, wherein transmitting the update comprises transmitting a plurality of transport blocks, as described above.

Process 600 may include additional aspects, such as any single aspect or any combination of aspects described below and/or in connection with one or more other processes described elsewhere herein.

In a first aspect, the machine learning component comprises at least one neural network model.

In a second aspect, alone or in combination with the first aspect, the at least one lower layer comprises at least one of a physical layer or a medium access control layer.

In a third aspect, alone or in combination with one or more of the first and second aspects, process 600 includes preparing the update for transmission using an upper layer of the wireless communication protocol stack.

In a fourth aspect, alone or in combination with one or more of the first through third aspects, the wireless communication protocol stack comprises a user plane protocol stack.

In a fifth aspect, alone or in combination with one or more of the first through fourth aspects, the upper layer comprises at least one of a radio link control layer, a packet data convergence protocol layer, or a service data adaptation protocol layer.

In a sixth aspect, alone or in combination with one or more of the first through fifth aspects, the wireless communication protocol stack comprises a control plane protocol stack.

In a seventh aspect, alone or in combination with one or more of the first through sixth aspects, the upper layer comprises at least one of a radio link control layer, a packet data convergence protocol layer, a radio resource control layer, or a non-access stratum layer.

In an eighth aspect, alone or in combination with one or more of the first through seventh aspects, process 600 includes preparing the update for transmission using the at least one lower layer of the wireless communication protocol stack.

In a ninth aspect, alone or in combination with one or more of the first through eighth aspects, process 600 includes collecting a set of training data, and determining the update associated with the machine learning component by training the machine learning component using the set of training data.

In a tenth aspect, alone or in combination with one or more of the first through ninth aspects, the update comprises an updated machine learning component.

In an eleventh aspect, alone or in combination with one or more of the first through tenth aspects, process 600 includes segmenting the update into the plurality of transport blocks using one or more upper layers of the wireless communication protocol stack.

In a twelfth aspect, alone or in combination with one or more of the first through eleventh aspects, process 600 includes generating, based at least in part on the plurality of transport blocks and using the one or more upper layers of the wireless communication protocol stack, a plurality of data packets, and preparing the plurality of data packets for transmission based at least in part on a specified quality of service.

In a thirteenth aspect, alone or in combination with one or more of the first through twelfth aspects, process 600 includes receiving, using one or more lower layers of the wireless communication protocol stack, a plurality of data packets associated with a globally updated machine learning component from the server device.

In a fourteenth aspect, alone or in combination with one or more of the first through thirteenth aspects, process 600 includes obtaining the globally updated machine learning component from the plurality of data packets using one or more upper layers of the wireless communication protocol stack, and configuring the globally updated machine learning component to a physical layer of the wireless communication protocol stack.

In a fifteenth aspect, alone or in combination with one or more of the first through fourteenth aspects, the client device comprises a user equipment, and the server device comprises a base station.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
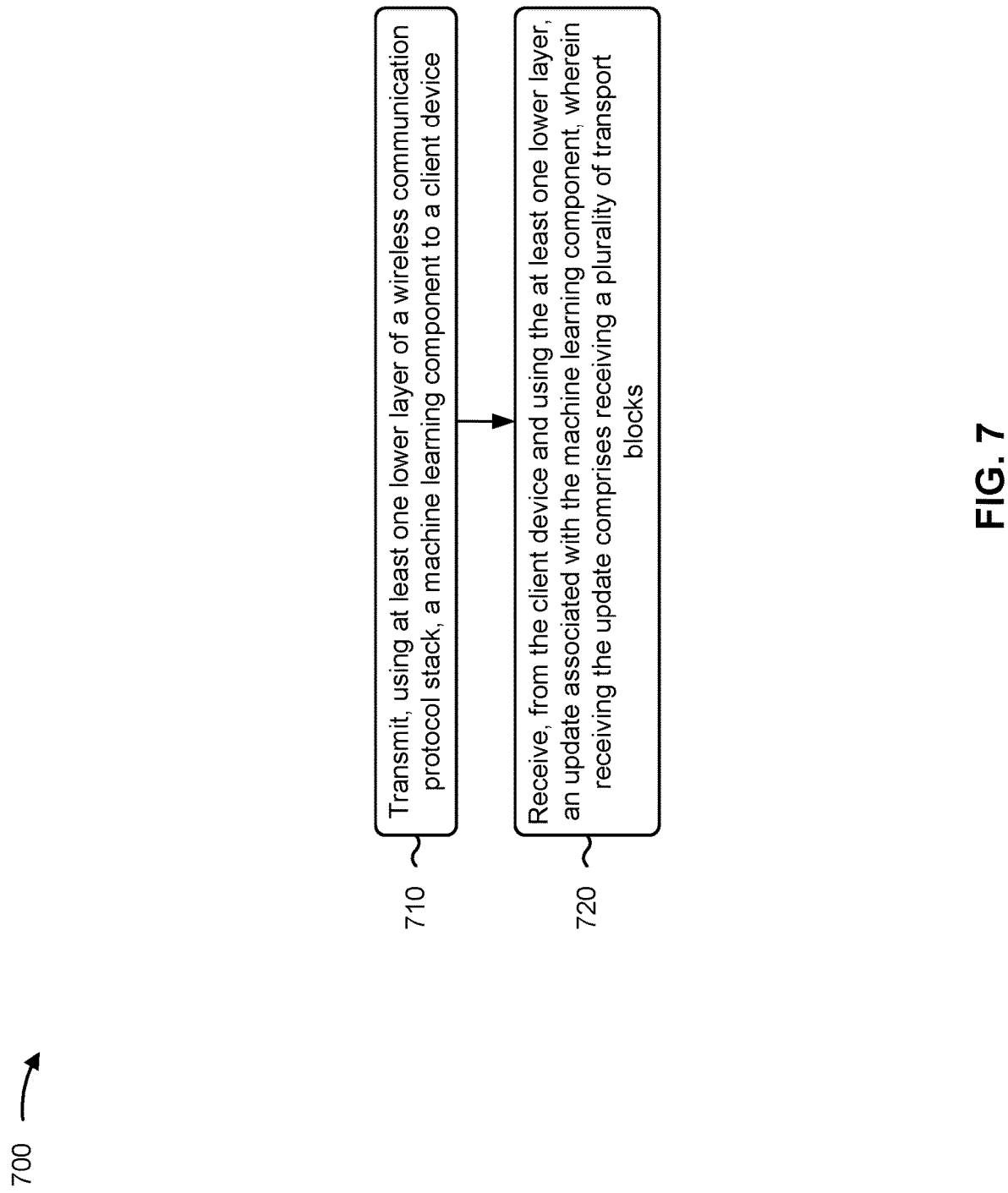

FIG. 7 is a diagram illustrating an example process 700 performed, for example, by a server device, in accordance with the present disclosure. Example process 700 is an example where the server device (e.g., server device 408 shown in FIG. 4, server device 510 shown in FIG. 5) performs operations associated with machine learning component management in federated learning.

As shown in FIG. 7, in some aspects, process 700 may include transmitting, using at least one lower layer of a wireless communication protocol stack, a machine learning component to a client device (block 710). For example, the server device (e.g., using transmission component 1006, depicted in FIG. 10) may transmit, using at least one lower layer of a wireless communication protocol stack, a machine learning component to a client device, as described above.

As further shown in FIG. 7, in some aspects, process 700 may include receiving, from the client device and using the at least one lower layer, an update associated with the machine learning component, wherein receiving the update comprises receiving a plurality of transport blocks (block 720). For example, the server device (e.g., using reception component 1002, depicted in FIG. 10) may receive, from the client device and using the at least one lower layer, an update associated with the machine learning component, wherein receiving the update comprises receiving a plurality of transport blocks, as described above.

Process 700 may include additional aspects, such as any single aspect or any combination of aspects described below and/or in connection with one or more other processes described elsewhere herein.

In a first aspect, the machine learning component comprises at least one neural network.

In a second aspect, alone or in combination with the first aspect, the at least one lower layer comprises at least one of a physical layer or a medium access control layer.

In a third aspect, alone or in combination with one or more of the first and second aspects, receiving the update comprises receiving a plurality of data packets, and wherein process 700 further comprises obtaining the update from the plurality of data packets using one or more upper layers of the wireless communication protocol stack, and configuring the update to a physical layer of the wireless communication protocol stack.

In a fourth aspect, alone or in combination with one or more of the first through third aspects, the wireless communication protocol stack comprises a user plane protocol stack.

In a fifth aspect, alone or in combination with one or more of the first through fourth aspects, the one or more upper layers comprise at least one of a radio link control layer, a packet data convergence protocol layer, or a service data adaptation protocol layer.

In a sixth aspect, alone or in combination with one or more of the first through fifth aspects, the wireless communication protocol stack comprises a control plane protocol stack.

In a seventh aspect, alone or in combination with one or more of the first through sixth aspects, the one or more upper layers comprise at least one of a radio link control layer, a packet data convergence protocol layer, a radio resource control layer, or a non-access stratum layer.

In an eighth aspect, alone or in combination with one or more of the first through seventh aspects, process 700 includes receiving, from at least one additional client device, at least one additional update corresponding to the machine learning component, and aggregating the update and the at least one additional update to generate a globally updated machine learning component.

In a ninth aspect, alone or in combination with one or more of the first through eighth aspects, aggregating the update and the at least one additional update comprises averaging the update and the at least one additional update.

In a tenth aspect, alone or in combination with one or more of the first through ninth aspects, process 700 includes segmenting the globally updated machine learning component into an additional plurality of transport blocks using one or more upper layers of the wireless communication protocol stack.

In an eleventh aspect, alone or in combination with one or more of the first through tenth aspects, process 700 includes generating, based at least in part on the additional plurality of transport blocks and using the one or more upper layers of the wireless communication protocol stack, a plurality of data packets, and preparing the plurality of data packets for transmission based at least in part on a specified quality of service.

In a twelfth aspect, alone or in combination with one or more of the first through eleventh aspects, process 700 includes transmitting, using one or more lower layers of the wireless communication protocol stack, the plurality of data packets.

In a thirteenth aspect, alone or in combination with one or more of the first through twelfth aspects, process 700 includes preparing the globally updated machine learning component for transmission using the at least one lower layer of the wireless communication protocol stack.

In a fourteenth aspect, alone or in combination with one or more of the first through thirteenth aspects, the client device comprises a user equipment, and the server device comprises a base station.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
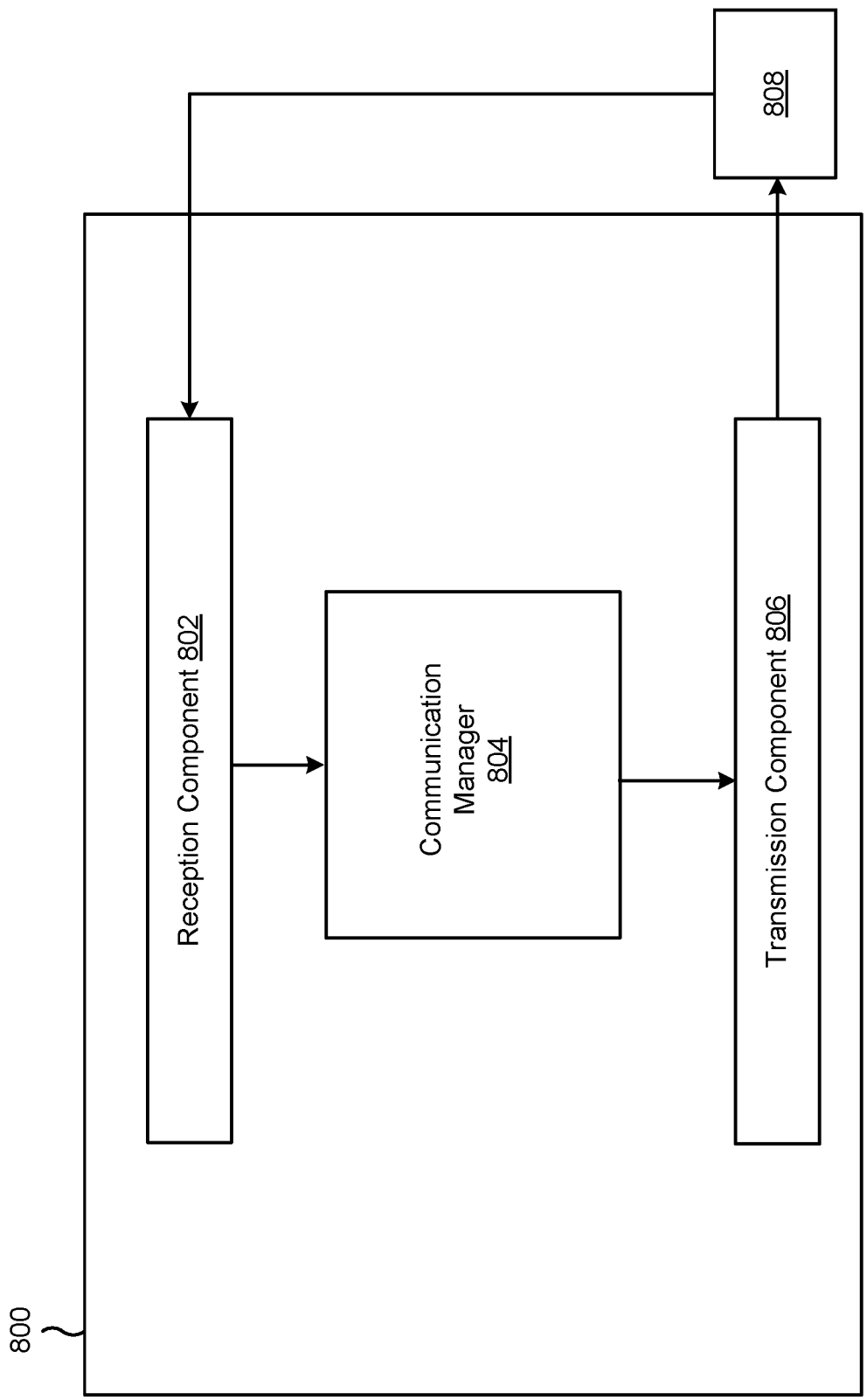
FIGS. 8-11 are block diagrams of example apparatuses for wireless communication, in accordance with the present disclosure.

FIG. 8 is a block diagram of an example apparatus 800 for wireless communication in accordance with the present disclosure. The apparatus 800 may be, be similar to, include, or be included in a client (e.g., client 402 shown in FIG. 4 and/or client 505 shown in FIG. 5). In some aspects, the apparatus 800 includes a reception component 802, a communication manager 804, and a transmission component 806, which may be in communication with one another (for example, via one or more buses). As shown, the apparatus 800 may communicate with another apparatus 808 (such as a client, a server, a UE, a base station, or another wireless communication device) using the reception component 802 and the transmission component 806.

In some aspects, the apparatus 800 may be configured to perform one or more operations described herein in connection with FIGS. 4 and/or 5. Additionally, or alternatively, the apparatus 800 may be configured to perform one or more processes described herein, such as process 600 of FIG. 6. In some aspects, the apparatus 800 may include one or more components of the first UE described above in connection with FIG. 2.

The reception component 802 may provide means for receiving communications, such as reference signals, control information, data communications, or a combination thereof, from the apparatus 808. The reception component 802 may provide received communications to one or more other components of the apparatus 800, such as the communication manager 804. In some aspects, the reception component 802 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the first UE described above in connection with FIG. 2.

The transmission component 806 may provide means for transmitting communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may provide means for performing signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the first UE described above in connection with FIG. 2. In some aspects, the transmission component 806 may be co-located with the reception component 802 in a transceiver.

In some aspects, the communication manager 804 may provide means for receiving, using at least one lower layer of a wireless communication protocol stack, a machine learning component from a server device, and means for transmitting, to the server device and using the at least one lower layer, an update associated with the machine learning component, wherein transmitting the update comprises transmitting a plurality of transport blocks. In some aspects, the communication manager 804 may include a controller/processor, a memory, or a combination thereof, of the first UE described above in connection with FIG. 2. In some aspects, the communication manager 804 may include the reception component 802, the transmission component 806, and/or the like. In some aspects, the means provided by the communication manager 804 may include, or be included within, means provided by the reception component 802, the transmission component 806, and/or the like.

In some aspects, the communication manager 804 and/or one or more components of the communication manager 804 may include or may be implemented within hardware (e.g., the circuitry described in connection with FIG. 2). In some aspects, the communication manager 804 and/or one or more components thereof may include or may be implemented within a controller/processor, a memory, or a combination thereof, of the UE 120 described above in connection with FIG. 2.

In some aspects, the communication manager 804 and/or one or more components of the communication manager 804 may be implemented in code (e.g., as software or firmware stored in a memory). For example, the communication manager 804 and/or a component (or a portion of a component) of the communication manager 804 may be implemented as instructions or code stored in a non-transitory computer-readable medium and executable by a controller or a processor to perform the functions or operations of the communication manager 804 and/or the component. If implemented in code, the functions of the communication manager 804 and/or a component may be executed by a controller/processor, a memory, a scheduler, a communication unit, or a combination thereof, of the UE 120 described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
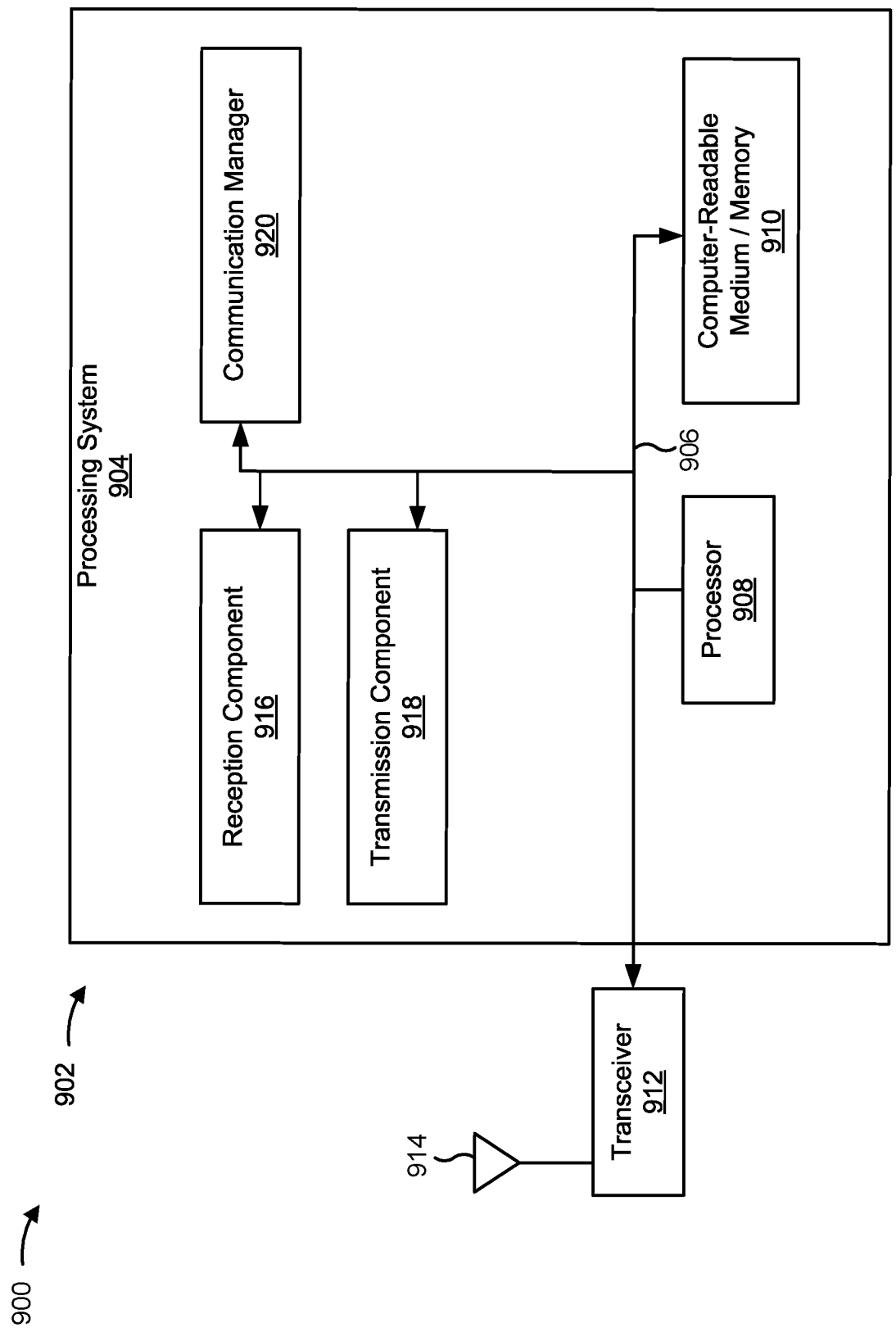

FIG. 9 is a diagram illustrating an example 900 of a hardware implementation for an apparatus 902 employing a processing system 904. The apparatus 902 may be, be similar to, include, or be included in the apparatus 800 shown in FIG. 8.

The processing system 904 may be implemented with a bus architecture, represented generally by the bus 906. The bus 906 may include any number of interconnecting buses and bridges depending on the specific application of the processing system 904 and the overall design constraints. The bus 906 links together various circuits including one or more processors and/or hardware components, represented by a processor 908, the illustrated components, and the computer-readable medium/memory 910. The bus 906 may also link various other circuits, such as timing sources, peripherals, voltage regulators, power management circuits, and/or the like.

The processing system 904 may be coupled to a transceiver 912. The transceiver 912 is coupled to one or more antennas 914. The transceiver 912 provides a means for communicating with various other apparatuses over a transmission medium. The transceiver 912 receives a signal from the one or more antennas 914, extracts information from the received signal, and provides the extracted information to the processing system 904, specifically a reception component 916. In addition, the transceiver 912 receives information from the processing system 904, specifically a transmission component 918, and generates a signal to be applied to the one or more antennas 914 based at least in part on the received information.

The processor 908 is coupled to the computer-readable medium/memory 910. The processor 908 is responsible for general processing, including the execution of software stored on the computer-readable medium/memory 910. The software, when executed by the processor 908, causes the processing system 904 to perform the various functions described herein in connection with a client. The computer-readable medium/memory 910 may also be used for storing data that is manipulated by the processor 908 when executing software. The processing system 904 may include a communication manager 920 and/or any number of additional components not illustrated in FIG. 9. The components illustrated and/or not illustrated may be software modules running in the processor 908, resident/stored in the computer-readable medium/memory 910, one or more hardware modules coupled to the processor 908, or some combination thereof.

In some aspects, the processing system 904 may be a component of the UE 120 and may include the memory 282 and/or at least one of the TX MIMO processor 266, the receive (RX) processor 258, and/or the controller/processor 280. In some aspects, the apparatus 902 for wireless communication provides means for receiving, using at least one lower layer of a wireless communication protocol stack, a machine learning component from a server device, and means for transmitting, to the server device and using the at least one lower layer, an update associated with the machine learning component, wherein transmitting the update comprises transmitting a plurality of transport blocks. The aforementioned means may be one or more of the aforementioned components of the processing system 904 of the apparatus 902 configured to perform the functions recited by the aforementioned means. As described elsewhere herein, the processing system 904 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

Figure 10:
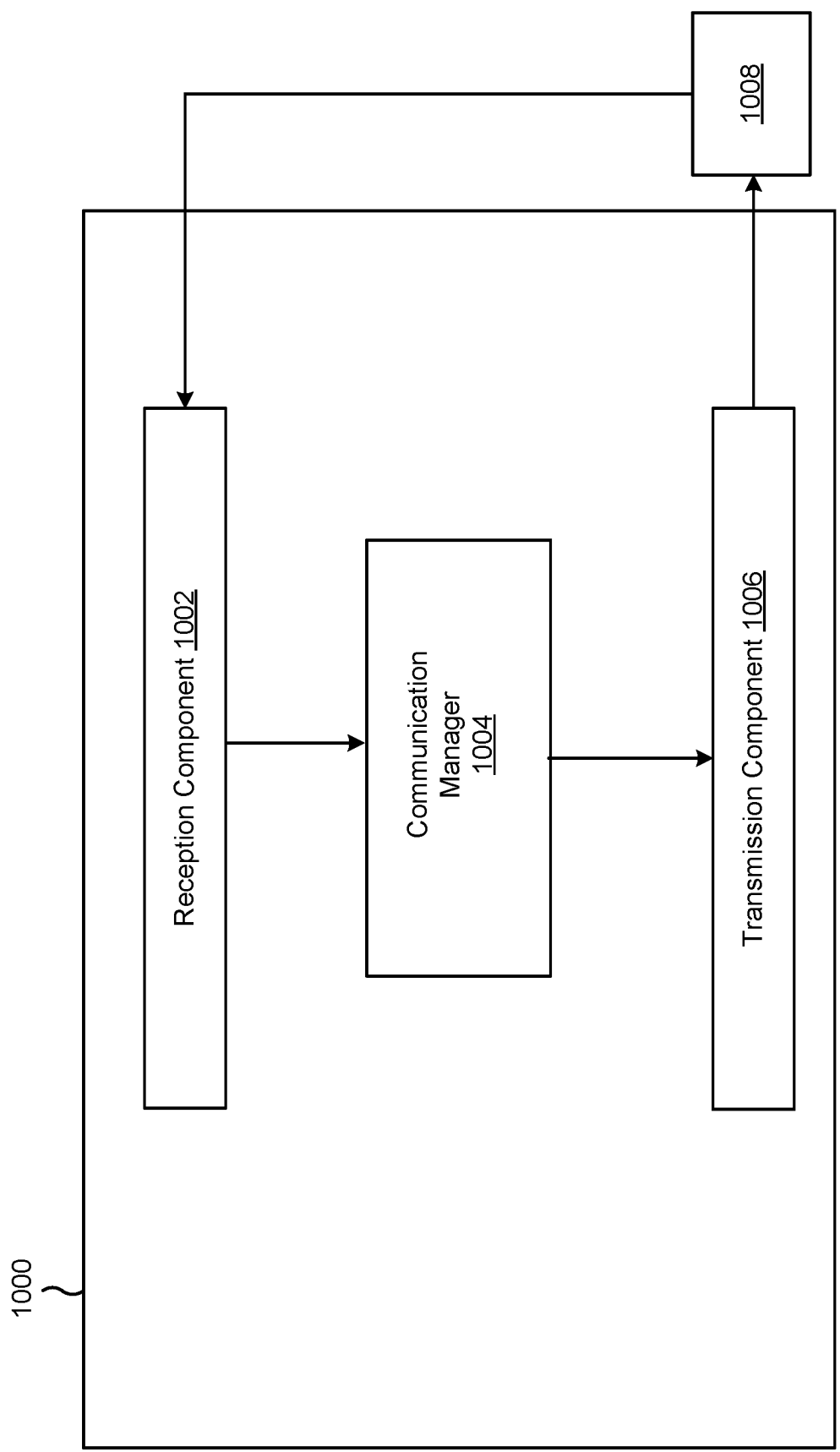

FIG. 10 is a block diagram of an example apparatus 1000 for wireless communication in accordance with the present disclosure. The apparatus 1000 may be, be similar to, include, or be included in a server device (e.g., server device 408 shown in FIG. 4 and/or server device 510 shown in FIG. 5). In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a client, a server, a UE, a base station, or another wireless communication device) using the reception component 1002 and the transmission component 1006.

In some aspects, the apparatus 1000 may be configured to perform one or more operations described herein in connection with FIGS. 4 and/or 5. Additionally, or alternatively, the apparatus 1000 may be configured to perform one or more processes described herein, such as process 700 of FIG. 7. In some aspects, the apparatus 1000 may include one or more components of the base station described above in connection with FIG. 2.

The reception component 1002 may provide means for receiving communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 2.

The transmission component 1006 may provide means for transmitting communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may provide means for performing signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 2. In some aspects, the transmission component 1006 may be co-located with the reception component 1002 in a transceiver.

The communication manager 1004 may provide means for transmitting, using at least one lower layer of a wireless communication protocol stack, a machine learning component to a client device, and means for receiving, from the client device and using the at least one lower layer, an update associated with the machine learning component, wherein receiving the update comprises receiving a plurality of transport blocks. In some aspects, the communication manager 1004 may include a controller/processor, a memory, a scheduler, a communication unit, or a combination thereof, of the base station described above in connection with FIG. 2. In some aspects, the communication manager 1004 may include the reception component 1002, the transmission component 1006, and/or the like. In some aspects, the means provided by the communication manager 1004 may include, or be included within, means provided by the reception component 1002, the transmission component 1006, and/or the like.

In some aspects, the communication manager 1004 and/or one or more components thereof may include or may be implemented within hardware. In some aspects, the communication manager 1004 and/or one or more components thereof may include or may be implemented within a controller/processor, a memory, or a combination thereof, of the BS 110 described above in connection with FIG. 2.

In some aspects, the communication manager 1004 and/or one or more components thereof may be implemented in code (e.g., as software or firmware stored in a memory). For example, the communication manager 1004 and/or a component (or a portion of a component) of the communication manager 1004 may be implemented as instructions or code stored in a non-transitory computer-readable medium and executable by a controller or a processor to perform the functions or operations of the communication manager 1004 and/or the component. If implemented in code, the functions of the communication manager 1004 and/or a component may be executed by a controller/processor, a memory, a scheduler, a communication unit, or a combination thereof, of the BS 110 described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
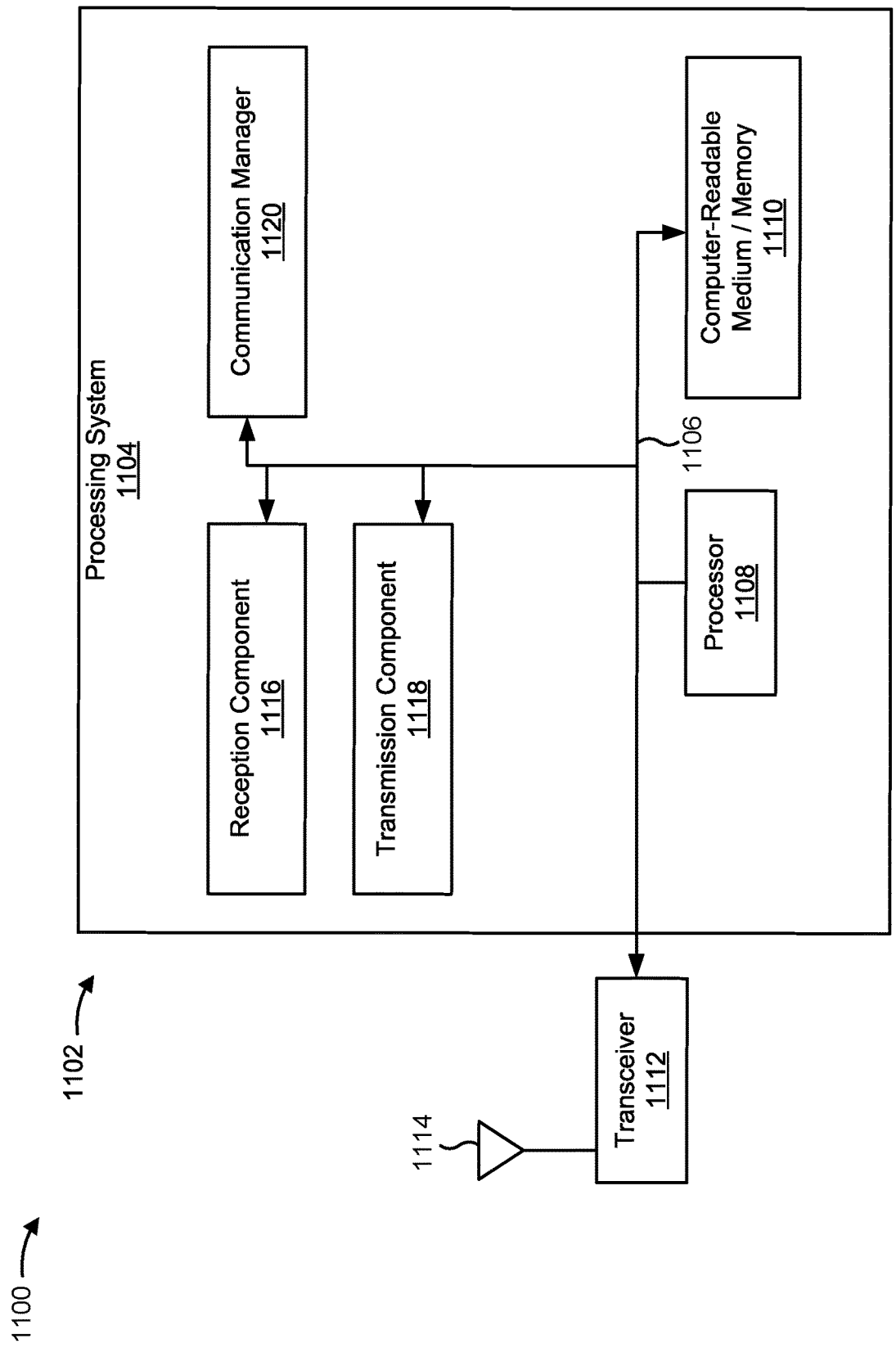

FIG. 11 is a diagram illustrating an example 1100 of a hardware implementation for an apparatus 1102 employing a processing system 1104. The apparatus 1102 may be, be similar to, include, or be included in the apparatus 1000 shown in FIG. 10.

The processing system 1104 may be implemented with a bus architecture, represented generally by the bus 1106. The bus 1106 may include any number of interconnecting buses and bridges depending on the specific application of the processing system 1104 and the overall design constraints. The bus 1106 links together various circuits including one or more processors and/or hardware components, represented by a processor 1108, the illustrated components, and the computer-readable medium/memory 1110. The bus 1106 may also link various other circuits, such as timing sources, peripherals, voltage regulators, power management circuits, and/or the like.

The processing system 1104 may be coupled to a transceiver 1112. The transceiver 1112 is coupled to one or more antennas 1114. The transceiver 1112 provides a means for communicating with various other apparatuses over a transmission medium. The transceiver 1112 receives a signal from the one or more antennas 1114, extracts information from the received signal, and provides the extracted information to the processing system 1104, specifically a reception component 1116. In addition, the transceiver 1112 receives information from the processing system 1104, specifically a transmission component 1118, and generates a signal to be applied to the one or more antennas 1114 based at least in part on the received information.

The processor 1108 is coupled to the computer-readable medium/memory 1110. The processor 1108 is responsible for general processing, including the execution of software stored on the computer-readable medium/memory 1110. The software, when executed by the processor 1108, causes the processing system 1104 to perform the various functions described herein in connection with a server. The computer-readable medium/memory 1110 may also be used for storing data that is manipulated by the processor 1108 when executing software. The processing system 1104 may include a communication manager 1120 and/or any number of additional components not illustrated in FIG. 11. The components illustrated and/or not illustrated may be software modules running in the processor 1108, resident/stored in the computer-readable medium/memory 1110, one or more hardware modules coupled to the processor 1108, or some combination thereof.

In some aspects, the processing system 1104 may be a component of the UE 120 and may include the memory 282 and/or at least one of the TX MIMO processor 266, the RX processor 258, and/or the controller/processor 280. In some aspects, the apparatus 1102 for wireless communication provides means for transmitting, using at least one lower layer of a wireless communication protocol stack, a machine learning component to a client device, and means for receiving, from the client device and using the at least one lower layer, an update associated with the machine learning component, wherein receiving the update comprises receiving a plurality of transport blocks. The aforementioned means may be one or more of the aforementioned components of the processing system 1104 of the apparatus 1102 configured to perform the functions recited by the aforementioned means. As described elsewhere herein, the processing system 1104 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

The following provides an overview of some Aspects of the present disclosure:

Aspect 1: A method of wireless communication performed by a client device, comprising: receiving, using at least one lower layer of a wireless communication protocol stack, a machine learning component from a server device; and transmitting, to the server device and using the at least one lower layer, an update associated with the machine learning component, wherein transmitting the update comprises transmitting a plurality of transport blocks.

Aspect 2: The method of Aspect 1, wherein the machine learning component comprises at least one neural network model.

Aspect 3: The method of either of Aspects 1 or 2, wherein the at least one lower layer comprises at least one of a physical layer or a medium access control layer.

Aspect 4: The method of any of Aspects 1-3, further comprising preparing the update for transmission using an upper layer of the wireless communication protocol stack.

Aspect 5: The method of Aspect 4, wherein the wireless communication protocol stack comprises a user plane protocol stack.

Aspect 6: The method of Aspect 5, wherein the upper layer comprises at least one of a radio link control layer, a packet data convergence protocol layer, or a service data adaptation protocol layer.

Aspect 7: The method of any of Aspects 1-3, wherein the wireless communication protocol stack comprises a control plane protocol stack.

Aspect 8: The method of Aspect 7, wherein the upper layer comprises at least one of a radio link control layer, a packet data convergence protocol layer, a radio resource control layer, or a non-access stratum layer.

Aspect 9: The method of any of Aspects 1-8, further comprising preparing the update for transmission using the at least one lower layer of the wireless communication protocol stack.

Aspect 10: The method of any of Aspects 1-9, further comprising: collecting a set of training data; and determining the update associated with the machine learning component by training the machine learning component using the set of training data.

Aspect 11: The method of Aspect 10, wherein the update comprises an updated machine learning component.

Aspect 12: The method of any of Aspects 1-10, further comprising segmenting the update into the plurality of transport blocks using one or more upper layers of the wireless communication protocol stack.

Aspect 13: The method of Aspect 12, further comprising: generating, based at least in part on the plurality of transport blocks and using the one or more upper layers of the wireless communication protocol stack, a plurality of data packets; and preparing the plurality of data packets for transmission based at least in part on a specified quality of service.

Aspect 14: The method of any of Aspects 1-13, further comprising receiving, using one or more lower layers of the wireless communication protocol stack, a plurality of data packets associated with a globally updated machine learning component from the server device.

Aspect 15: The method of Aspect 14, further comprising: obtaining the globally updated machine learning component from the plurality of data packets using one or more upper layers of the wireless communication protocol stack; and configuring the globally updated machine learning component to a physical layer of the wireless communication protocol stack.

Aspect 16: The method of any of Aspects 1-15, wherein the client device comprises a user equipment, and wherein the server device comprises a base station.

Aspect 17: A method of wireless communication performed by a server device, comprising: transmitting, using at least one lower layer of a wireless communication protocol stack, a machine learning component to a client device; and receiving, from the client device and using the at least one lower layer, an update associated with the machine learning component, wherein receiving the update comprises receiving a plurality of transport blocks.

Aspect 18: The method of Aspect 17, wherein the machine learning component comprises at least one neural network.

Aspect 19: The method of either of Aspects 17 or 18, wherein the at least one lower layer comprises at least one of a physical layer or a medium access control layer.

Aspect 20: The method of any of Aspects 17-19, wherein receiving the update comprises receiving a plurality of data packets, and wherein the method further comprises: obtaining the update from the plurality of data packets using one or more upper layers of the wireless communication protocol stack; and configuring the update to a physical layer of the wireless communication protocol stack.

Aspect 21: The method of Aspect 20, wherein the wireless communication protocol stack comprises a user plane protocol stack.

Aspect 22: The method of Aspect 21, wherein the one or more upper layers comprise at least one of a radio link control layer, a packet data convergence protocol layer, or a service data adaptation protocol layer.

Aspect 23: The method of Aspect 20, wherein the wireless communication protocol stack comprises a control plane protocol stack.

Aspect 24: The method of Aspect 23, wherein the one or more upper layers comprise at least one of a radio link control layer, a packet data convergence protocol layer, a radio resource control layer, or a non-access stratum layer.

Aspect 25: The method of any of Aspects 17-24, further comprising: receiving, from at least one additional client device, at least one additional update corresponding to the machine learning component; and aggregating the update and the at least one additional update to generate a globally updated machine learning component.

Aspect 26: The method of Aspect 25, wherein aggregating the update and the at least one additional update comprises averaging the update and the at least one additional update.

Aspect 27: The method of either of Aspects 25 or 26, further comprising segmenting the globally updated machine learning component into an additional plurality of transport blocks using one or more upper layers of the wireless communication protocol stack.

Aspect 28: The method of Aspect 27, further comprising: generating, based at least in part on the additional plurality of transport blocks and using the one or more upper layers of the wireless communication protocol stack, a plurality of data packets; and preparing the plurality of data packets for transmission based at least in part on a specified quality of service.

Aspect 29: The method of Aspect 28, further comprising transmitting, using one or more lower layers of the wireless communication protocol stack, the plurality of data packets.

Aspect 30: The method of any of Aspects 27-29, further comprising preparing the globally updated machine learning component for transmission using the at least one lower layer of the wireless communication protocol stack.

Aspect 31: The method of any of Aspects 17-30, wherein the client device comprises a user equipment, and wherein the server device comprises a base station.

Aspect 32: An apparatus for wireless communication at a device, comprising a processor; memory coupled with the processor; and instructions stored in the memory and executable by the processor to cause the apparatus to perform the method of one or more of Aspects 1-16.

Aspect 33: A device for wireless communication, comprising a memory and one or more processors coupled to the memory, the one or more processors configured to perform the method of one or more of Aspects 1-16.

Aspect 34: An apparatus for wireless communication, comprising at least one means for performing the method of one or more of Aspects 1-16.

Aspect 35: A non-transitory computer-readable medium storing code for wireless communication, the code comprising instructions executable by a processor to perform the method of one or more of Aspects 1-16.

Aspect 36: A non-transitory computer-readable medium storing a set of instructions for wireless communication, the set of instructions comprising one or more instructions that, when executed by one or more processors of a device, cause the device to perform the method of one or more of Aspects 1-16.

Aspect 37: An apparatus for wireless communication at a device, comprising a processor; memory coupled with the processor; and instructions stored in the memory and executable by the processor to cause the apparatus to perform the method of one or more of Aspects 17-31.

Aspect 38: A device for wireless communication, comprising a memory and one or more processors coupled to the memory, the one or more processors configured to perform the method of one or more of Aspects 17-31.

Aspect 39: An apparatus for wireless communication, comprising at least one means for performing the method of one or more of Aspects 17-31.

Aspect 40: A non-transitory computer-readable medium storing code for wireless communication, the code comprising instructions executable by a processor to perform the method of one or more of Aspects 17-31.

Aspect 41: A non-transitory computer-readable medium storing a set of instructions for wireless communication, the set of instructions comprising one or more instructions that, when executed by one or more processors of a device, cause the device to perform the method of one or more of Aspects 17-31.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a client device, comprising:
a memory; and
one or more processors, coupled to the memory, configured to:
receive, using at least one lower layer of a wireless communication protocol stack, a machine learning component from a server device;
transmit, to the server device and using the at least one lower layer, an update associated with the machine learning component, wherein transmitting the update comprises transmitting a plurality of transport blocks; and
receive, using one or more lower layers of the wireless communication protocol stack, a plurality of data packets associated with a globally updated machine learning component from the server device, the globally updated machine learning component being segmented into an additional plurality of transport blocks using one or more upper layers of a wireless communication protocol stack of the server device.

2. The apparatus of claim 1, wherein the machine learning component comprises at least one neural network model.

3. The apparatus of claim 1, wherein the at least one lower layer comprises at least one of a physical layer or a medium access control layer.

4. The apparatus of claim 1, wherein the one or more processors are further configured to prepare the update for transmission using an upper layer of the wireless communication protocol stack.

5. The apparatus of claim 4, wherein the wireless communication protocol stack comprises a user plane protocol stack.

6. The apparatus of claim 5, wherein the upper layer comprises at least one of a radio link control layer, a packet data convergence protocol layer, or a service data adaptation protocol layer.

7. The apparatus of claim 4, wherein the wireless communication protocol stack comprises a control plane protocol stack.

8. The apparatus of claim 7, wherein the upper layer comprises at least one of a radio link control layer, a packet data convergence protocol layer, a radio resource control layer, or a non-access stratum layer.

9. The apparatus of claim 1, wherein the one or more processors are further configured to prepare the update for transmission using the at least one lower layer of the wireless communication protocol stack.

10. The apparatus of claim 1, wherein the one or more processors are further configured to:
collect a set of training data; and
determine the update associated with the machine learning component by training the machine learning component using the set of training data.

11. The apparatus of claim 10, wherein the update comprises an updated machine learning component.

12. The apparatus of claim 1, wherein the one or more processors are further configured to segment the update into the plurality of transport blocks using one or more upper layers of the wireless communication protocol stack.

13. The apparatus of claim 12, wherein the one or more processors are further configured to:
generate, based at least in part on the plurality of transport blocks and using the one or more upper layers of the wireless communication protocol stack, an additional plurality of data packets; and
prepare the additional plurality of data packets for transmission based at least in part on a specified quality of service.

14. The apparatus of claim 1, wherein the one or more processors are further configured to:
obtain the globally updated machine learning component from the plurality of data packets using one or more upper layers of the wireless communication protocol stack; and
configure the globally updated machine learning component to a physical layer of the wireless communication protocol stack.

15. The apparatus of claim 1, wherein the client device comprises a user equipment, and wherein the server device comprises a base station.

16. An apparatus for wireless communication at a server device, comprising:
a memory; and
one or more processors, coupled to the memory, configured to:
transmit, using at least one lower layer of a wireless communication protocol stack, a machine learning component to a client device;
receive, from the client device and using the at least one lower layer, an update associated with the machine learning component, wherein receiving the update comprises receiving a plurality of transport blocks; and transmit, using one or more lower layers of the wireless communication protocol stack, a plurality of data packets associated with a globally updated machine learning component to the client device, the globally updated machine learning component being segmented into an additional plurality of transport blocks using one or more upper layers of the wireless communication protocol stack.

17. The apparatus of claim 16, wherein the machine learning component comprises at least one neural network.

18. The apparatus of claim 16, wherein the at least one lower layer comprises at least one of a physical layer or a medium access control layer.

19. The apparatus of claim 16, wherein to receive the update, the one or more processors is configured to receive an additional plurality of data packets, and wherein the one or more processors is further configured to:
obtain the update from the additional plurality of data packets using the one or more upper layers of the wireless communication protocol stack; and
configure the update to a physical layer of the wireless communication protocol stack.

20. The apparatus of claim 19, wherein the wireless communication protocol stack comprises a user plane protocol stack, and wherein the one or more upper layers comprise at least one of a radio link control layer, a packet data convergence protocol layer, or a service data adaptation protocol layer.

21. The apparatus of claim 19, wherein the wireless communication protocol stack comprises a control plane protocol stack, and wherein the one or more upper layers comprise at least one of a radio link control layer, a packet data convergence protocol layer, a radio resource control layer, or a non-access stratum layer.

22. The apparatus of claim 16, wherein the one or more processors are further configured to:
receive, from at least one additional client device, at least one additional update corresponding to the machine learning component; and
aggregate the update and the at least one additional update to generate the globally updated machine learning component.

23. The apparatus of claim 22, wherein the one or more processors, to aggregate the update and the at least one additional update, are configured to average the update and the at least one additional update.

24. The apparatus of claim 16, wherein the one or more processors are further configured to:
generate, based at least in part on the additional plurality of transport blocks and using the one or more upper layers of the wireless communication protocol stack, the plurality of data packets; and
prepare the plurality of data packets for transmission based at least in part on a specified quality of service.

25. The apparatus of claim 16, wherein the one or more processors are further configured to prepare the globally updated machine learning component for transmission using the at least one lower layer of the wireless communication protocol stack.

26. A method of wireless communication performed by a client device, comprising:
receiving, using at least one lower layer of a wireless communication protocol stack, a machine learning component from a server device;
transmitting, to the server device and using the at least one lower layer, an update associated with the machine learning component, wherein transmitting the update comprises transmitting a plurality of transport blocks; and
receiving, using one or more lower layers of the wireless communication protocol stack, a plurality of data packets associated with a globally updated machine learning component from the server device, the globally updated machine learning component being segmented into an additional plurality of transport blocks using one or more upper layers of a wireless communication protocol stack of the server device.

27. A method of wireless communication performed by a server device, comprising:
transmitting, using at least one lower layer of a wireless communication protocol stack, a machine learning component to a client device;
receiving, from the client device and using the at least one lower layer, an update associated with the machine learning component, wherein receiving the update comprises receiving a plurality of transport blocks; and
transmitting, using one or more lower layers of the wireless communication protocol stack, a plurality of data packets associated with a globally updated machine learning component to the client device, the globally updated machine learning component being segmented into an additional plurality of transport blocks using one or more upper layers of the wireless communication protocol stack.

28. The method of claim 26, further comprising:
collecting a set of training data; and
determining the update associated with the machine learning component by training the machine learning component using the set of training data.

29. The method of claim 28, wherein the update comprises an updated machine learning component.

30. The method of claim 27, further comprising:
receiving, from at least one additional client device, at least one additional update corresponding to the machine learning component; and
aggregating the update and the at least one additional update to generate the globally updated machine learning component.

* * * * *